United States Patent
Arnold et al.

(10) Patent No.: US 11,348,780 B2
(45) Date of Patent: May 31, 2022

(54) METHODS AND SYSTEMS UTILIZING ULTRASOUND-ASSISTED SAMPLING INTERFACES FOR MASS SPECTROMETRIC ANALYSIS

(71) Applicant: DH Technologies Development Pte. Ltd., Singapore (SG)

(72) Inventors: Don W Arnold, Livermore, CA (US); Thomas R. Covey, Richmond Hill (CA); Chang Liu, Richmond Hill (CA)

(73) Assignee: DH Technologies Development Pte. Ltd., Singapore (SG)

( * ) Notice: Subject to any disclaimer, the term of this patent is extended or adjusted under 35 U.S.C. 154(b) by 21 days.

(21) Appl. No.: 16/765,910

(22) PCT Filed: Nov. 20, 2018

(86) PCT No.: PCT/IB2018/059138
§ 371 (c)(1),
(2) Date: May 21, 2020

(87) PCT Pub. No.: WO2019/102350
PCT Pub. Date: May 31, 2019

(65) Prior Publication Data
US 2020/0365382 A1    Nov. 19, 2020

Related U.S. Application Data

(60) Provisional application No. 62/589,071, filed on Nov. 21, 2017.

(51) Int. Cl.
*H01J 49/00* (2006.01)
*H01J 49/04* (2006.01)
(Continued)

(52) U.S. Cl.
CPC ............ *H01J 49/045* (2013.01); *G01B 17/06* (2013.01); *G01F 23/296* (2013.01); *G01N 1/14* (2013.01);
(Continued)

(58) Field of Classification Search
CPC .. H01J 49/045; H01J 49/0404; H01J 49/0468; H01J 49/165; H01J 49/4215;
(Continued)

(56) References Cited

U.S. PATENT DOCUMENTS 8,153,964 B2 * 4/2012 Chen .................. H01J 49/10
250/288
2012/0080592 A1 * 4/2012 Wiseman ............ H01J 49/0459
250/282
(Continued)

FOREIGN PATENT DOCUMENTS

WO     2010114976 A1   10/2010

OTHER PUBLICATIONS

International Search Report and Written Opinion for PCT/IB2018/059138 dated Mar. 8, 2019.

Primary Examiner — Michael Maskell

(57) ABSTRACT

An ultrasonic transmitter (95) and detector (e.g., integrated as an ultrasound transducer) utilized in a feedback control system automatically monitors and/or detects surface profile (e.g., shape) of the liquid-air interface and adjusts the flow rate of sampling liquid to ensure that experimental conditions remain consistent at the time of sample introduction during serial samplings. The feedback control can provide for automated adjustment of the surface profile of the liquid-air interface in accordance with changes in desired set point according to an experimental workflow (e.g., automated adjustment between an interface corresponding to a vortex sampling set point and an overflow cleaning set
(Continued)

point). Improvements in desorption efficiency and quality of mass spectrometry data by degassing of the liquid solvent utilized within the sampling interfaces, and/or utilization in a feedback control system for generating data indicative of a surface profile of the liquid-air interface within the interface's sampling port may be realized.

12 Claims, 8 Drawing Sheets

(51) Int. Cl.
*G01B 17/06* (2006.01)
*G01F 23/296* (2022.01)
*G01N 1/14* (2006.01)
*G01N 1/40* (2006.01)
*H01J 49/16* (2006.01)
*H01J 49/42* (2006.01)

(52) U.S. Cl.
CPC .......... *G01N 1/405* (2013.01); *H01J 49/0404* (2013.01); *H01J 49/0468* (2013.01); *H01J 49/165* (2013.01); *H01J 49/4215* (2013.01)

(58) Field of Classification Search
CPC .... H01J 49/0454; G01B 17/06; G01F 23/296; G01N 1/14; G01N 1/405; G01N 2001/383; G01N 2001/4061; G01N 2001/4094; G01N 2291/02836; G01N 1/4055; G01N 29/02; G01N 29/222
USPC .............................. 250/281, 282, 288, 423 R
See application file for complete search history.

(56) References Cited

U.S. PATENT DOCUMENTS

| | | |
|---|---|---|
| 2012/0121464 A1 | 5/2012 | Nogami |
| 2014/0319335 A1* | 10/2014 | Morris ................... G01N 29/02 250/282 |
| 2017/0176401 A1* | 6/2017 | Bajic ....................... G01N 30/06 |
| 2017/0316926 A1 | 11/2017 | Arnold |
| 2018/0158661 A1* | 6/2018 | Eberlin ................ G01N 33/487 |

* cited by examiner

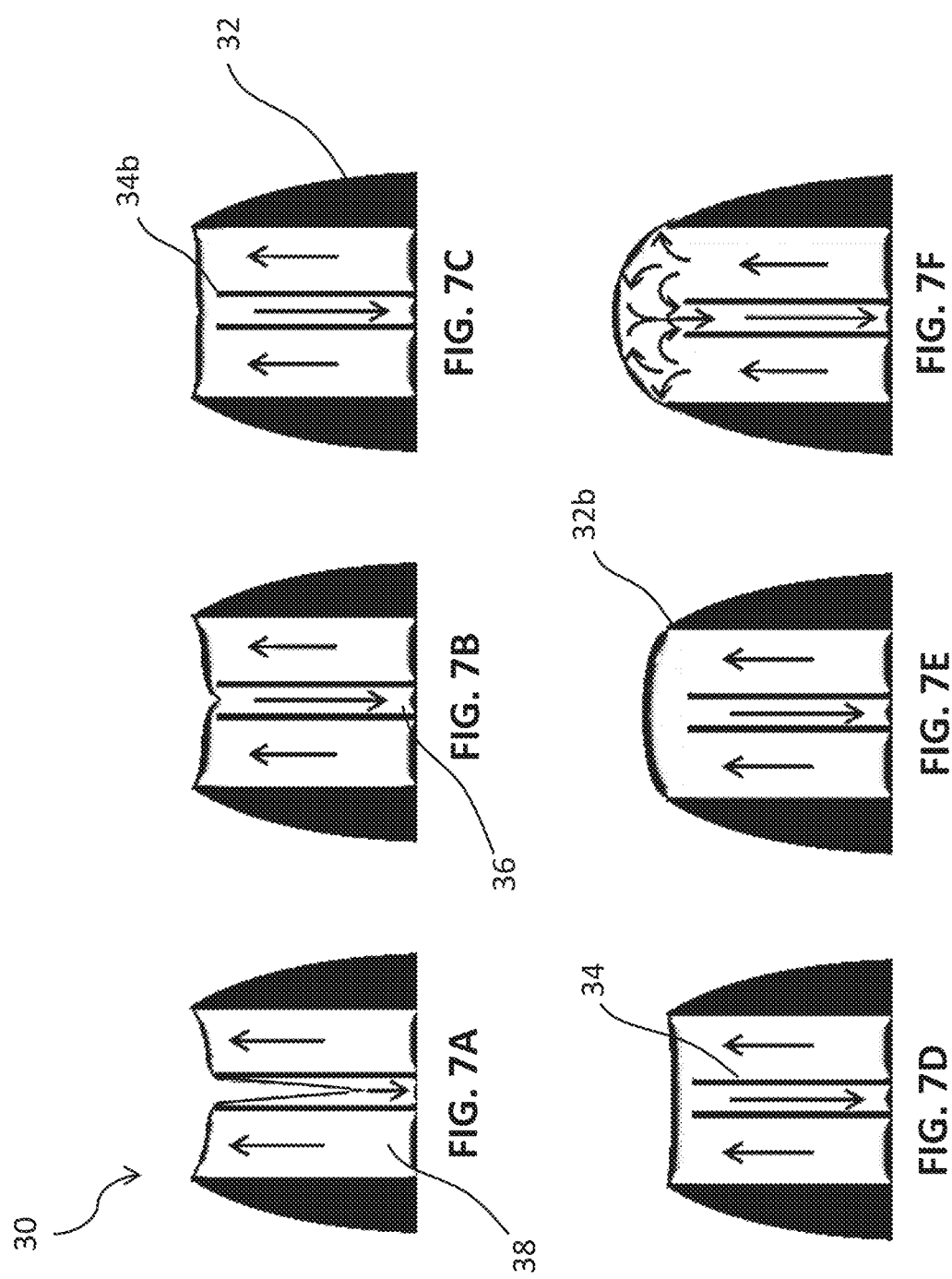

METHODS AND SYSTEMS UTILIZING ULTRASOUND-ASSISTED SAMPLING INTERFACES FOR MASS SPECTROMETRIC ANALYSIS

RELATED APPLICATION

This application claims the benefit of priority from U.S. Provisional Application No. 62/589,071, filed on 21 Nov. 2017, the entire contents of which are incorporated by reference herein.

FIELD

The present teachings generally relate to mass spectrometry, and more particularly, to ultrasound-assisted sampling interfaces for mass spectrometry systems and methods.

INTRODUCTION

Mass spectrometry (MS) is an analytical technique for determining the elemental composition of test substances with both qualitative and quantitative applications. MS can be useful for identifying unknown compounds, determining the isotopic composition of elements in a molecule, determining the structure of a particular compound by observing its fragmentation, and quantifying the amount of a particular compound in a sample. Given its sensitivity and selectivity, MS is particularly important in life science applications.

In the analysis of complex sample matrices (e.g., biological, environmental, and food samples), many current MS techniques require extensive pre-treatment steps to be performed on the sample prior to MS detection/analysis of the analyte of interest. Such pre-analytical steps can include sampling (i.e., sample collection) and sample preparation (separation from the matrix, concentration, fractionation and, if necessary, derivatization). It has been estimated, for example, that more than 80% of the time of overall analytical process can be spent on sample collection and preparation in order to enable the analyte's detection via MS or to remove potential sources of interference contained within the sample matrix, while nonetheless increasing potential sources of dilution and/or error at each sample preparation stage.

Ideally, sample preparation and sample introduction techniques for MS should be fast, reliable, reproducible, inexpensive, and in some aspects, amenable to automation. By way of example, various ionization methods have been developed that can desorb/ionize analytes from condensed-phase samples with minimal sample handling (e.g., desorption electrospray ionization (DESI) and direct analysis in real time (DART), which "wipe-off" analytes from the samples by exposing their surfaces to an ionizing medium such as a gas or an aerosol). However, such techniques can also require sophisticated and costly equipment, and may be amenable only for a limited class of highly-volatile small molecules. Another recent example of an improved sample introduction technique is an "open port" sampling interface in which relatively unprocessed samples can be introduced into a continuous flowing solvent that is delivered to an ion source of a MS system, as described for example in an article entitled "An open port sampling interface for liquid introduction atmospheric pressure ionization mass spectrometry" of Van Berkel et al., published in *Rapid Communications in Mass Spectrometry*, 29(19), pp. 1749-1756 (2015), which is incorporated by reference in its entirety.

There remains a need for improved sample introduction techniques that provide sensitivity, simplicity, selectivity, speed, reproducibility, and high-throughput.

SUMMARY

Methods and systems for improving mass spectrometry (MS) data generated from sampling interfaces having an open sampling port from which a liquid is delivered to an ion source for mass spectrometric analysis are provided herein. In accordance with various aspects of the present teachings, MS-based systems and methods are provided in which a source of ultrasound energy (e.g., an ultrasonic transmitter) is associated with at least one of the sampling interface and a sample substrate configured for insertion within the sampling interface so as to provide ultrasound energy thereto. In various aspects, the use of a source of ultrasound energy can provide improved desorption efficiency, improve the quality of the MS data by degassing of the liquid solvent utilized within the sampling interfaces, and/or be utilized in a feedback control system for generating data indicative of a surface profile of the liquid-air interface within the interface's sampling port. In some aspects, for example, an ultrasound energy module coupled to one of the sampling interface or a sampling substrate itself can improve the elution of analytes from a solid-phase sample substrate, for example, by agitating the desorption liquid within the sampling probe so as to increase the efficiency of mass transfer from the sampling substrate. Additionally or alternatively, the ultrasound energy can be effective to remove bubbles from the liquid delivered to the ion source so as to reduce the presence of aberrations or spikes in the MS data that can be observed when bubbles are discharged into the ionization chamber. Moreover, in various aspects of the methods and systems provided herein, an ultrasonic transmitter and detector (e.g., an ultrasound transducer) can be utilized in a feedback control system so as to automatically monitor and/or detect the surface profile (e.g., shape) of the liquid-air interface (e.g., without human intervention) and adjust the flow rate of the sampling liquid to ensure that experimental conditions remain consistent at the time of sample introduction for serial samplings. In such aspects, for example, the ultrasound energy that is reflected from the liquid-air interface can be detected so as to enable the flow rate of a liquid (e.g., a desorption solvent) into and/or out of a sampling probe to be selectively adjusted so as to maintain a desired liquid-air interface within the sampling port and a stable and reproducible analyte flow of consistent dilution to the ion source, thereby increasing the reproducibility and/or accuracy of the MS analysis. Additionally or alternatively, the feedback control can utilize the detected ultrasound energy so as to provide for the automated adjustment of the surface profile of the liquid-air interface in accordance with a change in the desired set point according to an experimental workflow (e.g., automated adjustment between an interface corresponding to a vortex sampling set point and an overflow cleaning set point between samplings).

In accordance with various exemplary aspects of the present teachings, a system for analyzing a chemical composition of a specimen is provided, the system comprising a reservoir for storing a liquid and a sampling probe having an open end partially defining a sample space configured to receive the liquid from the reservoir, the liquid within the sample space further configured to receive through the open end one or more analytes of a sample. The system can further comprise a pump for delivering the liquid from the reservoir to an ion source via the sample space, the ion source being configured to discharge the liquid having the one or more analytes entrained therein into an ionization chamber in fluid communication with a sampling orifice of a mass spectrometer. An ultrasonic transmitter is also provided for applying ultrasound energy to at least one of the liquid within the sample space, the sampling probe, and a sample substrate to be inserted into the liquid within the sample space. By way of non-limiting example, the sample can be one of a liquid sample containing one or more analytes that can be introduced (e.g., pipetted into the open end of the sampling probe, acoustically injected) or a sample substrate having one or more analytes adsorbed thereto such that at least a portion of said one or more analytes are desorbed therefrom into the desorption solvent within the sample space.

Ultrasonic transmitters can be associated with the sampling probe in a variety of manners. By way of example, in some aspects, in which the sample comprises a sample substrate, the ultrasonic transmitter can be coupled thereto and can be configured to apply ultrasound energy to the sample substrate upon insertion thereof into the sample space (e.g., under the influence of a controller for activating the ultrasonic transducer upon insertion of the sample substrate within into the sample space). In such aspects, the ultrasound energy can facilitate desorption into the liquid of one or more analytes adsorbed onto a surface of the sample substrate, for example, by agitating (e.g., vibrating) the substrate within the liquid and/or by generating heat within the substrate and/or liquid so as to increase the elution efficiency of the analytes. In various aspects, the ultrasonic transmitter can be coupled to the sampling probe so as to apply ultrasound energy to the sampling probe and the liquid therewithin. In some aspects, for example, the ultrasonic transmitter can be disposed in the fluid flow path of the liquid before or after the sample space so as to be in contact with the liquid being flowed through the sampling probe. In various aspects, the ultrasound energy can be effective to increase agitation of the liquid within the sample space and/or remove bubbles from the liquid delivered to the ion source so as to reduce the presence of aberrations or spikes in the MS data when bubbles are discharged by the ion source into the ionization chamber.

In addition to the above described benefits of the ultrasonic transmitter in accordance with various aspects of the present teachings, in some aspects the ultrasound energy provided by the ultrasonic transmitter can additionally or alternatively be utilized in a feedback-based control system for controlling the surface profile of the liquid-air interface within the open end of the sampling probe. In certain aspects, for example, the system can further comprise an ultrasound detector configured to detect the ultrasound energy that is reflected from the liquid-air interface at the open end of the sampling probe so as to generate data indicative of a surface profile of the liquid-air interface. A controller, operatively coupled to the ultrasound detector, can be configured to generate control signals based on the surface profile data for adjusting the surface profile of the liquid-air interface, for example, by adjusting the flow rates of the liquid into and out of the sampling probe. By way of non-limiting example, the control signals generated by the controller are configured to adjust the flow rate of liquid within the sampling probe by adjusting at least one of the flow rate of liquid provided by the pump and the flow rate of a nebulizer gas that surrounds the discharge end of the ion source.

Sampling probes in accordance with the present teachings can have a variety of configurations but are generally include an open end by which the liquid delivered from the reservoir is open to the atmosphere and through which a sample containing or suspected of containing one or more analytes can be received. In accordance with various aspects of the present teachings, the sampling probe can comprise an outer capillary tube extending from a proximal end to a distal end and an inner capillary tube extending from a proximal end to a distal end and disposed within said outer capillary tube, wherein the distal end of the inner capillary tube is recessed relative to the distal end of the outer capillary tube so as to define the sample space between the distal end of the inner capillary tube, a portion of an inner wall of the outer capillary tube, and the distal end of the outer capillary tube. In such aspects, the inner and outer capillary tubes can define a solvent conduit and a sampling conduit in fluid communication with one another via said sample space, said solvent conduit extending from an inlet end configured to receive solvent (e.g., desorption solvent or other liquid) from the reservoir to an outlet end terminating at said sample space. The sampling conduit can extend from an inlet end commencing at the sample space for receiving from the sample space solvent in which the analytes are entrained to an outlet end fluidly coupled to the ion source.

In accordance with various exemplary aspects of the present teachings, a method for analyzing a chemical composition of a specimen is provided, the method comprising providing a flow of liquid to a sampling probe, said sampling probe having an open end partially defining a sample space configured to receive the liquid and further configured to receive through the open end one or more analytes of a sample into the liquid within the sample space. The method can further comprise applying ultrasound energy to at least one of the liquid within the sample space, the sampling probe, and a sample substrate at least during insertion thereof into the liquid within the sample space and discharging the liquid having the one or more analytes entrained therein into the ionization chamber for ionization therein. In various aspects, the ultrasound energy can be generated by an ultrasonic transmitter coupled to at least one of the sampling probe and the sample substrate, the method further comprising activating the ultrasonic transmitter upon insertion of a sampling probe into the sample space so as to facilitate desorption of one or more analytes adsorbed thereto. For example, in some aspects, the ultrasonic transmitter can be coupled to the sample substrate and can be configured to apply ultrasound waves to the sample substrate upon insertion thereof into the sample space such that the ultrasound waves facilitate desorption into the liquid within the sample space of one or more analytes adsorbed onto a surface of the sample substrate. Without being bound by any particular theory, the ultrasound energy can be configured to facilitate desorption into the liquid of one or more analytes adsorbed onto a surface of the sample substrate via at least one of increasing agitation of the liquid in the sample space and increasing the temperature of the liquid in the sample space. In various aspects, the ultrasound energy can be configured to degas the liquid provided by the pump prior to the liquid being delivered to the ion source.

In various aspects, applying ultrasound energy can comprise directing the ultrasound energy through the liquid toward a liquid-air interface at the open end of the sampling probe, wherein the method can further comprise detecting the reflected ultrasound energy to generate data indicative of a surface profile of the liquid-air interface at the open end of the sampling probe. Based on the surface profile data, the flow rate of the liquid within the sampling probe can be adjusted so as to control the surface profile of the liquid-air interface.

In accordance with various exemplary aspects of the present teachings, a system for analyzing a chemical composition of a specimen is provided, the system comprising a reservoir for storing a liquid and a sampling probe having an open end partially defining a sample space configured to receive the liquid from the reservoir, the liquid within the sample space further configured to receive through the open end one or more analytes of a sample. The system can further comprise a pump for delivering the liquid from the reservoir to an ion source via the sample space, wherein the ion source is configured to discharge the liquid having the one or more analytes entrained therein into an ionization chamber in fluid communication with a sampling orifice of a mass spectrometer. The system can additionally include an ultrasonic transmitter for applying ultrasound energy to at least one of the liquid within the sample space, the sampling probe, and a sample substrate to be inserted into the liquid within the sample space and an ultrasound detector for detecting the ultrasound energy reflected from the liquid-air interface at the open end of the sampling probe so as to generate data indicative of a surface profile of the liquid-air interface. Further, the system can include a controller for generating control signals based on the surface profile data for adjusting the surface profile of the liquid-air interface. In various aspects, the controller can be configured to compare the surface profile data to a reference surface profile and to generate control signals for adjusting the flow rate of liquid within the sampling probe so as to adjust the surface profile of the liquid-air interface in accordance with the reference surface profile, if necessary. By way of example, the control signals generated by the controller can be configured to adjust the flow rate of liquid within the sampling probe by adjusting at least one of the flow rate of liquid provided by the pump and the flow rate of a nebulizer gas that surrounds the discharge end of the ion source so as to adjust the surface profile of the liquid-air interface.

The liquid within the sample space can receive the analytes thereat in a variety of manners. By way of non-limiting example, the sample can comprise a liquid sample containing the one or more analytes, which can be introduced (e.g. by touch, injection, insertion, pipetted, acoustically injected, etc.) into the liquid within the sample space. Alternatively, in some aspects, the sample can comprise a sample substrate (e.g., a solid-phase microextraction (SPME) substrate), which can have one or more analytes adsorbed thereto. In various aspects, the liquid flowing from the reservoir can comprise a desorption solvent such that the analytes are desorbed from the sample substrate when inserted within the desorption solvent within the sample space.

The ultrasound detector can have a variety of configurations, but is generally configured to generate data indicative of the surface profile of the liquid-air interface at the open end of the sampling probe based on ultrasound energy received thereat. In some exemplary aspects, the ultrasonic transmitter and the ultrasound detector can comprise an integrated ultrasonic transducer module. In various aspects, the ultrasonic transmitter and the ultrasound detector can be disposed relative to the liquid air interface and one another so as to reflect and detect, respectively, the level of liquid within the sampling space at the center thereof.

In response to the detected surface profile, the controller can be configured to adjust the surface profile in a variety of manners. By way of example, the controller can be operatively connected to the pump and can be configured to adjust the flow rate of liquid within the sampling probe by adjusting the flow rate of liquid provided to the sample space by the pump. Additionally or alternatively, the system can further comprise a source of nebulizer gas for providing a nebulizing gas flow that surrounds the discharge end of the ion source, with the controller being operatively connected to the source of nebulizer gas so as to control the flow rate thereof. In such aspects, the controller can be configured to adjust the flow rate of liquid within the sampling probe by controlling a flow rate of nebulizing gas provided to the discharge end of the ion source.

The sampling probe can have a variety of configurations, but is generally configured to receive through the open end the sample containing one or more analytes within the liquid (e.g., desorption solvent) within the sample space. In various aspects, the sampling probe can comprise an outer capillary tube extending from a proximal end to a distal end, and an inner capillary tube extending from a proximal end to a distal end and disposed within said outer capillary tube, wherein the distal end of the inner capillary tube is recessed relative to the distal end of the outer capillary tube so as to define the sample space between the distal end of the inner capillary tube, a portion of an inner wall of the outer capillary tube, and the distal end of the outer capillary tube. In some related aspects, the inner and outer capillary tubes can define a solvent conduit and a sampling conduit in fluid communication with one another via the sample space, said solvent conduit extending from an inlet end configured to receive the liquid (e.g., desorption solvent) from the reservoir to an outlet end terminating at the sample space. The sampling conduit can extend from an inlet end commencing at said sample space for receiving from the sample space desorption solvent in which the desorbed analytes are entrained to an outlet end fluidly coupled to the ion source. In certain exemplary aspects, an axial bore of the inner capillary tube can at least partially define the sampling conduit and the space between the inner capillary tube and the outer capillary tube can define the solvent conduit. In some related aspects, the controller can be configured to adjust the flow rate of desorption solvent within the sampling probe so as to maintain the surface profile at a reference surface profile by adjusting at least one the flow rate of desorption solvent within the solvent conduit and the sampling conduit.

Feedback control systems in accordance with various aspects of the present teachings can help provide reliable, reproducible results across multiple samplings. By way of example, in certain aspects, the controller can be configured to maintain the surface profile at a reference surface profile for the serial insertion of a plurality of substrates or serial introduction of a liquid sample. Additionally, in some aspects, the controller can be configured to adjust the surface profile between each insertion of the plurality of substrates. By way of example, the controller can be configured to increase the flow rate of desorption solvent delivered to the sample space during at least a portion of the duration between each insertion of the plurality of substrates such that desorption solvent overflows from the sample space through the open end of the sampling probe (e.g., so as to clean the sampling probe between the serial insertions). Thereafter, the controller can be configured to re-adjust the flow rates such that the surface profile of the liquid-air interface during the addition of the next sample is the same as for the previous sample.

In accordance with various exemplary aspects of the present teachings, a method for analyzing a chemical composition of a specimen is provided, the method comprising providing a flow of liquid to a sampling probe, said sampling probe having an open end partially defining a sample space configured to receive the liquid and further configured to receive through the open end one or more analytes of a sample into the liquid within the sample space. The flow of the liquid having the one or more analytes entrained therein can be directed from the sample space to an ion source configured to discharge the liquid and analytes entrained therein into an ionization chamber in fluid communication with a sampling orifice of a mass spectrometer. The method can further comprise utilizing an ultrasonic transmitter to generate ultrasound energy directed to the liquid-air interface at the open end of the sampling probe and utilizing an ultrasound detector to detect the ultrasound energy reflected from the liquid-air interface so as to generate data indicative of a surface profile of the liquid-air interface at the open end of the sampling probe and based on the surface profile data, adjust the flow rate of the liquid within the sampling probe so as to adjust the surface profile of the liquid-air interface. In various aspects, the method can further comprise comparing the surface profile data with a reference surface profile, wherein adjusting the surface profile of the liquid-air interface can include adjusting the flow rate of liquid within the sampling probe so as to adjust the surface profile at the liquid-air interface in accordance with the reference surface profile. By way of example, the reference surface profile can comprise one of a dome-like liquid-air interface and a vortex-like liquid-air interface.

In certain aspects, the liquid provided by the reservoir can comprise desorption solvent, the method further comprising inserting a first substrate having one or more analytes adsorbed thereto into the desorption solvent within the sample space exhibiting a reference surface profile; removing the first substrate from the desorption solvent; and adjusting the surface profile of the liquid-air interface to the reference surface profile for insertion of a second substrate having one or more analytes adsorbed thereto into the desorption solvent. In some related aspects, the surface profile of the liquid-air interface can be adjusted between the insertion of the first and second substrates by increasing the flow rate of desorption solvent provided to the sampling probe such that desorption solvent overflows from the sample space through the open end of the sampling probe during at least a portion of the duration between insertion of the first and second substrates. Thereafter, the flow rates can then be adjusted (e.g., automatically without human intervention) for insertion of the second substrate.

In various aspects, adjusting the surface profile of the interface based on the surface profile data can comprise maintaining substantially the same volumetric flow rate of liquid provided by the pump while adjusting the flow rate of nebulizer gas surrounding the discharge end of the ion source.

These and other features of the applicant's teachings are set forth herein.

BRIEF DESCRIPTION OF THE DRAWINGS

The skilled person in the art will understand that the drawings, described below, are for illustration purposes only. The drawings are not intended to limit the scope of the applicant's teachings in any way.

FIGS. 7A-F schematically depict exemplary surface profile conditions that can be detected in accordance with various aspects of the present teachings.

DETAILED DESCRIPTION

Figure 1:
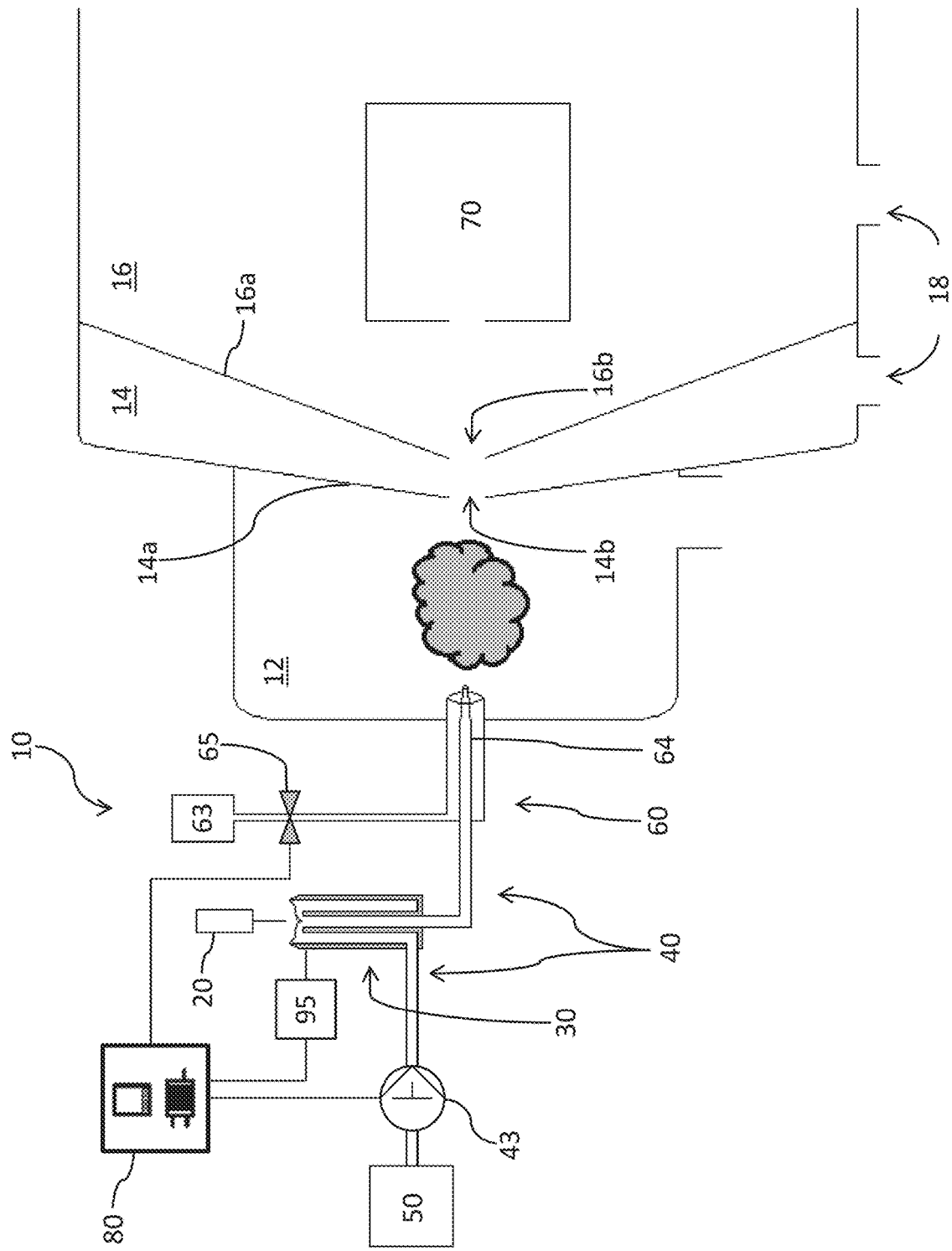
FIG. 1, in a schematic diagram, illustrates an exemplary system comprising a sampling probe associated with an ultrasonic module and interfaced with an electrospray ion source of a mass spectrometer system in accordance with various aspects of the applicant's teachings.

It will be appreciated that for clarity, the following discussion will explicate various aspects of embodiments of the applicant's teachings, while omitting certain specific details wherever convenient or appropriate to do so. For example, discussion of like or analogous features in alternative embodiments may be somewhat abbreviated. Well-known ideas or concepts may also for brevity not be discussed in any great detail. The skilled person will recognize that some embodiments of the applicant's teachings may not require certain of the specifically described details in every implementation, which are set forth herein only to provide a thorough understanding of the embodiments. Similarly it will be apparent that the described embodiments may be susceptible to alteration or variation according to common general knowledge without departing from the scope of the disclosure. The following detailed description of embodiments is not to be regarded as limiting the scope of the applicant's teachings in any manner.

In accordance with various aspects of the applicant's teachings, exemplary MS-based analytical systems and methods are provided herein in which ultrasound energy can be utilized in association with a sampling interface having an open sampling port to provide improved desorption efficiency, improve the quality of the MS data by degassing of the liquid solvent utilized within the sampling interfaces, and/or provide for feedback control based on data indicative of a surface profile of the liquid-air interface within the interface's sampling port. In some aspects, for example, an ultrasound energy module can be effective to agitate the desorption liquid within the sampling probe and/or increase a temperature thereof so as to increase the efficiency of mass transfer from the sampling substrate. Additionally or alternatively, the ultrasound energy can be effective to remove bubbles from the liquid delivered from the sampling probe to the ion source so as to reduce the presence of aberrations or spikes in the MS data that can be observed when bubbles are discharged into the ionization chamber. Moreover, in various aspects of the methods and systems provided herein, an ultrasonic transmitter and detector (e.g., an ultrasound transducer) can be utilized in a feedback control system so as to automatically monitor and/or detect the surface profile (e.g., shape) of the liquid-air interface (e.g., without human intervention) and adjust the flow rate of the sampling liquid to ensure that experimental conditions remain consistent between serial samplings (e.g., at the time of each sample introduction). In such aspects, for example, ultrasound energy that is reflected from the liquid-air interface can be detected so as to enable the flow rate of a liquid (e.g., a desorption solvent) into and/or out of a sampling probe to be selectively adjusted so as to maintain a desired liquid-air interface within the sampling port and a stable and reproducible analyte flow of consistent dilution to the ion source, thereby increasing the reproducibility and/or accuracy of the MS analysis. In various aspects, the feedback control can additionally or alternatively utilize the detected ultrasound energy so as to provide for the automated adjustment of the surface profile of the liquid-air interface in accordance with a change in the desired set point according to an experimental workflow (e.g., automated adjustment between an interface corresponding to a vortex sampling set point and an overflow cleaning set point between samplings).

FIG. 1 schematically depicts an embodiment of an exemplary system 10 in accordance with various aspects of the applicant's teachings for ionizing and mass analyzing analytes received within an open end of a sampling probe 30, the system 10 including an ultrasonic transducer 95 configured to apply ultrasound energy to one of the sampling probe 30, the liquid therein, or a substrate for insertion into the open end of the sampling probe 30. As shown in FIG. 1, the exemplary system 10 generally includes a sampling probe 30 (e.g., an open port probe) in fluid communication with a nebulizer-assisted ion source 60 for discharging a liquid containing one or more sample analytes (e.g., via electrospray electrode 64) into an ionization chamber 12, and a mass analyzer 70 in fluid communication with the ionization chamber 12 for downstream processing and/or detection of ions generated by the ion source 60. A fluid handling system 40 (e.g., including one or more pumps 43 and one or more conduits) provides for the flow of liquid from a reservoir 50 to the sampling probe 30 and from the sampling probe 30 to the ion source 60. For example, as shown in FIG. 1, the reservoir 50 (e.g., containing a liquid, desorption solvent) can be fluidly coupled to the sampling probe 30 via a supply conduit through which the liquid can be delivered at a selected volumetric rate by the pump 43 (e.g., a reciprocating pump, a positive displacement pump such as a rotary, gear, plunger, piston, peristaltic, diaphragm pump, or other pump such as a gravity, impulse, pneumatic, electrokinetic, and centrifugal pump), all by way of non-limiting example. As discussed in detail below, flow of liquid into and out of the sampling probe 30 occurs within a sample space accessible at the open end such that one or more analytes can be introduced into the liquid within the sample space and subsequently delivered to the ion source 60. As shown, the system 10 includes an ultrasonic transmitter 95 that is configured to generate ultrasound energy that can be applied to one of the sampling probe 30 and/or, in some aspects, a substrate 20 that is configured for insertion within the open end of the sampling probe 30. A controller 80 can be operatively coupled to the ultrasonic transmitter 95 and can be configured to activate the ultrasonic transmitter 95 so as to apply ultrasound energy as otherwise discussed herein substantially continuously or for selected portions of an experimental protocol (e.g., during insertion of the substrate 20 within the sampling probe 30), by way of non-limiting example.

Figure 2:
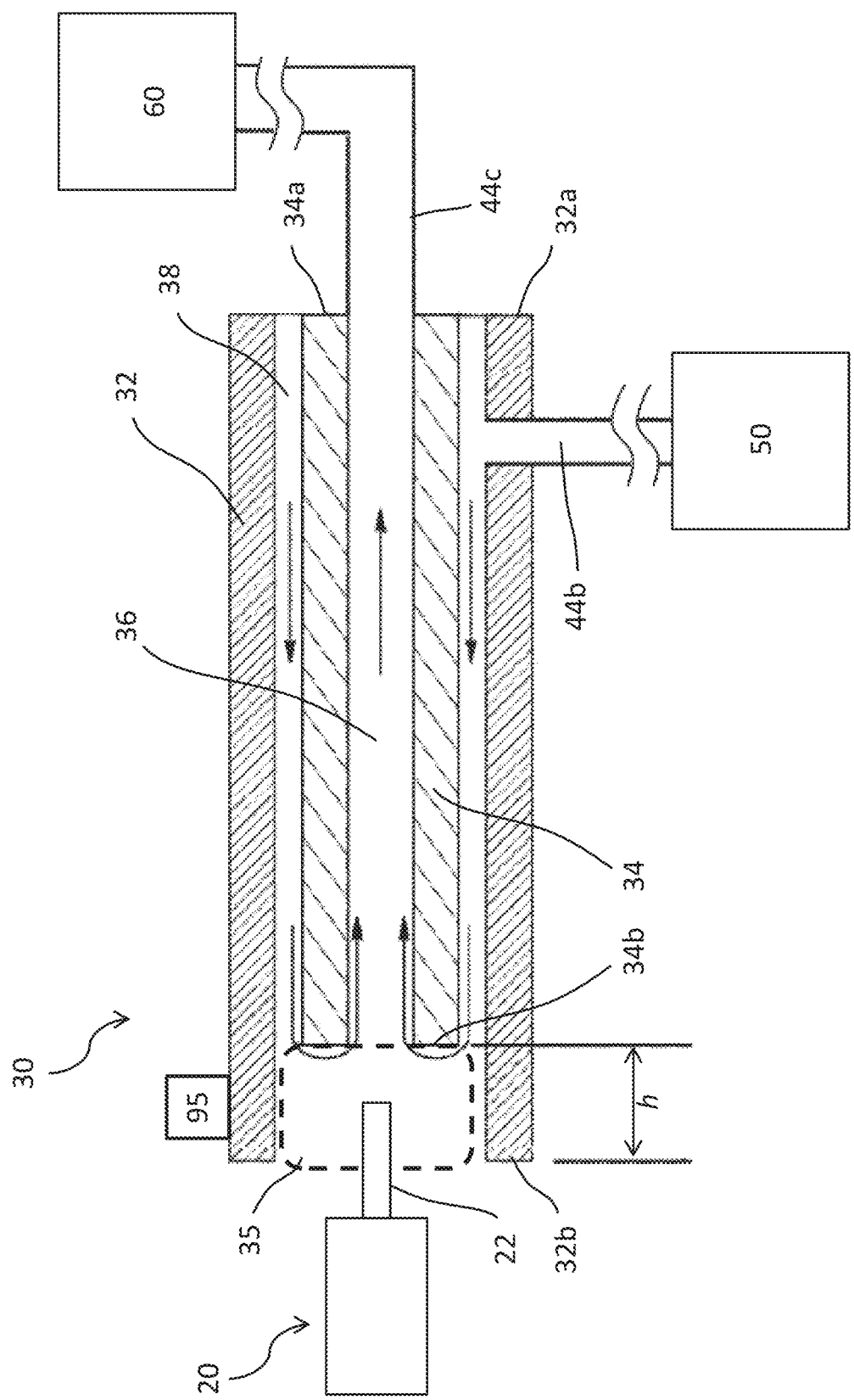
FIG. 2, in a schematic diagram, illustrates an exemplary sampling interface of FIG. 1 in additional detail, in accordance with various aspects of the applicant's teachings in which the ultrasonic transmitter is coupled to the sampling probe in accordance with various aspects of the applicant's teachings.
Figure 3:
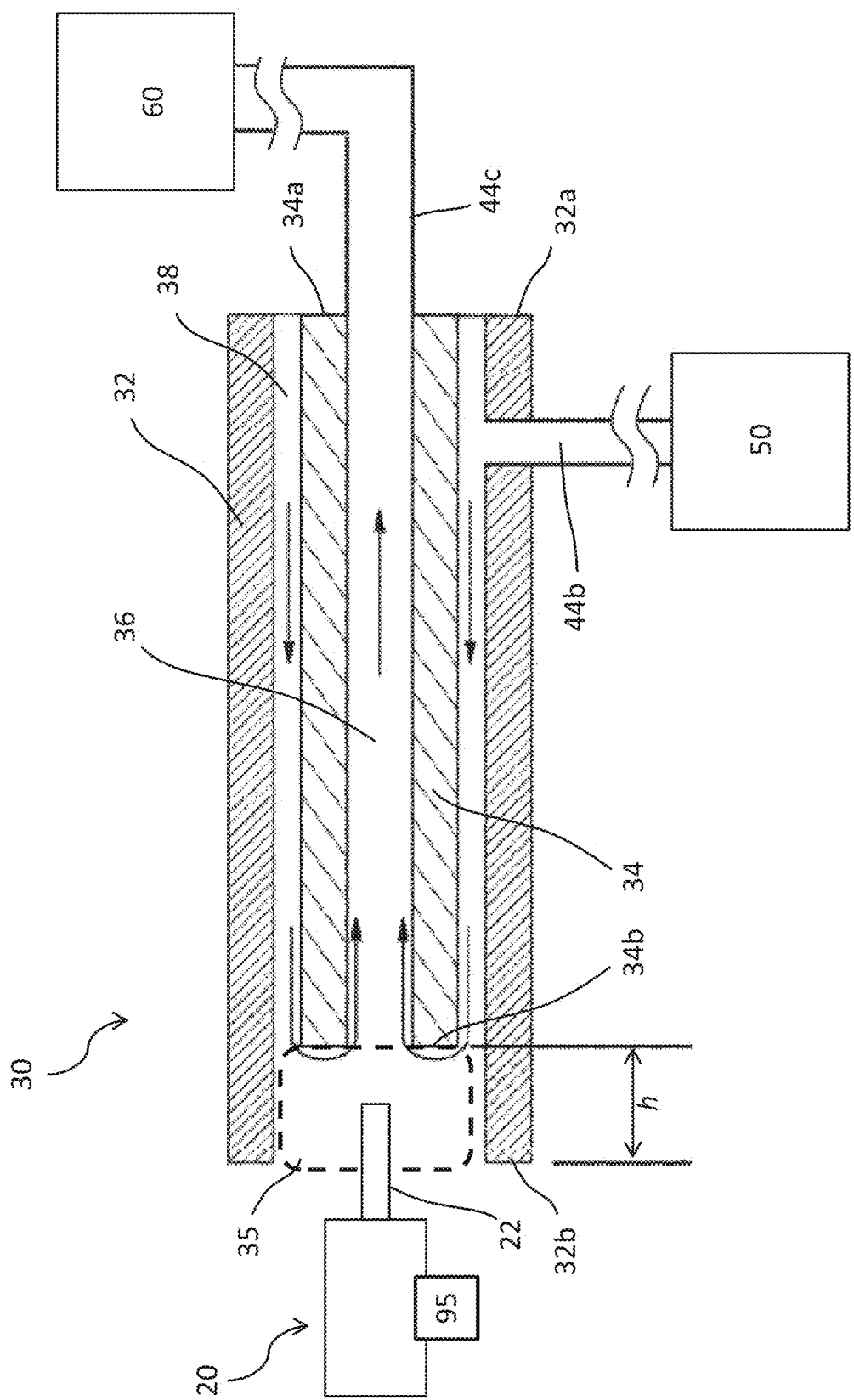
FIG. 3, in a schematic diagram, illustrates an exemplary sampling interface of FIG. 1 in additional detail, in accordance with various aspects of the applicant's teachings in which the ultrasonic transmitter is coupled to the sample substrate in accordance with various aspects of the applicant's teachings.

The ultrasonic transmitter 95 can have a variety of configurations but is generally configured to apply or propagate ultrasound energy (e.g., ultrasonic waves) into one or more of the sample substrate 20, the sampling probe 30, and the liquid contained within the sample space of the sampling probe 30, depending on implementation. As will be discussed in detail below with reference to FIGS. 2, 3, and 6, the ultrasound energy generated by the ultrasonic transmitter 95 by coupling the transmitter to the sample substrate 20 or the sampling probe can be effective to create tiny vibrations within the sample substrate 20, the sampling probe 30, and/or the liquid within the sampling probe 35 that can variously facilitate desorption of the analytes adsorbed onto the surface of the substrate 20 (e.g., via at least one of agitation of the substrate 20 and/or liquid, and/or through the generation of heat caused by the vibrations), facilitate degassing of the liquid delivered to the ion source 60, and/or facilitate detection of the liquid/air interface of the liquid within the open end of the sampling probe. For example, as shown in FIG. 2, at least one ultrasonic transmitter 95 can be coupled in proximity to the open end of the sampling probe 30 (e.g., via clamping, adhesion, magnetic attraction) such that acoustic waves generated thereby can propagate through the liquid within the sampling space so as to facilitate desorption through agitation of the liquid about a sample substrate inserted therein. Without being bound by any particular theory, in some additional or alternative aspects, the acoustic energy provided to the liquid within the sample space and/or the sample substrate 20 can be effective to generate an increase in temperature such that the extraction (binding)/elution(dissociation) equilibrium shifts to the dissociation state (thermodynamically). Likewise, the increased temperature can in some aspects be effective to increase the mass transfer speed, thereby reducing the time to reach equilibrium (kinetically). In alternative aspects, the ultrasonic transmitter may be mounted on the sample substrate 20 itself or in proximity thereto (e.g., on an actuation mechanism for delivering the sample substrate to the sampling probe 30) as shown in FIG. 3, such that the acoustic waves propagate through the sample substrate 20. In various aspects, the ultrasonic transmitter can comprise a separate ultrasonic probe, for example, that can be inserted within the liquid of the sampling space 35 (e.g., continuously, intermittently, and/or during the insertion of a sample substrate 20).

Ultrasonic transmitters 95 suitable for use in accordance with the present teachings can be configured to convert electrical energy into acoustic ultrasonic waves at a wide range of ultrasonic frequencies. By way of non-limiting example, the ultrasonic energy can exhibit a frequency of at least about 16 kHz, though ultrasonic waves of other frequencies can also be utilized in accordance with the present teachings. By way of non-limiting example, the ultrasound transmitter 95 can be a piezoelectric transducer, which includes a piezoelectric crystal that is configured to change size when a voltage is applied (e.g., ferroelectric piezoceramic crystalline materials such as lead zirconate titanate (PZT)). Alternatively, the ultrasonic transmitter 95 can be a capacitive transducer that utilizes electrostatic fields between a conductive diaphragm and a backing plate to generate the ultrasonic wave. Further, a person skilled in the art will appreciate that other ultrasonic transmitters 95 known in the art and modified in accordance with the present teachings can be suitable for use with the present principles as described for example with reference to system 10.

It will be appreciated that the controller 80 can be implemented in a variety of manners in accordance with the present teachings, but generally comprises one or more processors configured to generate control signals for controlling the operations of various elements of the system 10 as otherwise discussed herein. For example, the controller 80 can be configured to generate control signals such that the ultrasonic transmitter 95 generates ultrasound energy substantially continuously or for selected portions of an experimental protocol (e.g., during insertion of the substrate 20 within the sampling probe 30), by way of non-limiting example.

In accordance with certain aspects of the present teachings, the controller can comprise a digital processor executing one or more sequences of instructions contained in memory, which may be read into memory from another computer-readable medium (e.g., a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read). Execution of the sequences of instructions contained in memory causes processor to perform the process described herein. Alternatively hard-wired circuitry may be used in place of or in combination with software instructions to implement the present teachings. Thus implementations of the present teachings are not limited to any specific combination of hardware circuitry and software. In various embodiments, the controller 80 can be connected to one or more other computer systems across a network to form a networked system. The network can include a private network or a public network such as the Internet. In the networked system, one or more computer systems can store and serve the data to other computer systems. The one or more computer systems that store and serve the data can be referred to as servers or the cloud, in a cloud computing scenario. The one or more computer systems can include one or more web servers, for example. The other computer systems that send and receive data to and from the servers or the cloud can be referred to as client or cloud devices, for example.

The ion source 60 can have a variety of configurations but is generally configured to generate analytes contained within a liquid (e.g., the desorption solvent) that is received from the sampling probe 30. In the exemplary embodiment depicted in FIG. 1, an electrospray electrode 64, which can comprise a capillary that is fluidly coupled to the sampling probe 30, terminates in an outlet end that at least partially extends into the ionization chamber 12 and discharges the desorption solvent therein. As will be appreciated by a person skilled in the art in light of the present teachings, the outlet end of the electrospray electrode 64 can atomize, aerosolize, nebulize, or otherwise discharge (e.g., spray with a nozzle) the desorption solvent into the ionization chamber 12 to form a sample plume comprising a plurality of micro-droplets generally directed toward (e.g., in the vicinity of) the curtain plate aperture 14b and vacuum chamber sampling orifice 16b. As is known in the art, analytes contained within the micro-droplets can be ionized (i.e., charged) by the ion source 60, for example, as the sample plume is generated. By way of non-limiting example, the outlet end of the electrospray electrode 64 can be made of a conductive material and electrically coupled to a pole of a voltage source (not shown), while the other pole of the voltage source can be grounded. Micro-droplets contained within the sample plume can thus be charged by the voltage applied to the outlet end such that as the liquid or desorption solvent within the droplets evaporates during desolvation in the ionization chamber 12 such bare charged analyte ions are released and drawn toward and through the apertures 14b, 16b and focused (e.g., via one or more ion lens) into the mass analyzer 70. Though the ion source probe is generally described herein as an electrospray electrode 64, it should be appreciated that any number of different ionization techniques known in the art for ionizing liquid samples and modified in accordance with the present teachings can be utilized as the ion source 60. By way of non-limiting example, the ion source 60 can be an electrospray ionization device, a nebulizer assisted electrospray device, a chemical ionization device, a nebulizer assisted atomization device, a photoionization device, a laser ionization device, a thermospray ionization device, or a sonic spray ionization device.

As shown in FIG. 1, the exemplary ion source 60 can optionally include a source 63 of pressurized gas (e.g. nitrogen, air, or noble gas) that supplies a high velocity nebulizing gas flow which surrounds the outlet end of the electrospray electrode 64 and interacts with the liquid discharged therefrom to enhance the formation of the sample plume and the ion release within the plume for sampling by 14b and 16b, e.g., via the interaction of the high speed nebulizing flow and jet of liquid sample. The nebulizer gas can be supplied at a variety of flow rates, for example, in a range from about 0.1 L/min to about 20 L/min, which can also be controlled under the influence of controller 80 (e.g., via opening and/or closing valve 65). In accordance with various aspects of the present teachings, it will be appreciated that the flow rate of the nebulizer gas can be adjusted (e.g., under the influence of controller 80) such that the flow rate of liquid within the sampling probe 30 can be adjusted based, for example, on suction/aspiration force generated by the interaction of the nebulizer gas and the desorption solvent as it is being discharged from the electrospray electrode 64 (e.g., due to the Venturi effect).

In the depicted embodiment, the ionization chamber 12 can be maintained at an atmospheric pressure, though in some embodiments, the ionization chamber 12 can be evacuated to a pressure lower than atmospheric pressure. The ionization chamber 12, within which analytes desorbed from the substrate 20 can be ionized as the desorption solvent is discharged from the electrospray electrode 64, is separated from a gas curtain chamber 14 by a plate 14a having a curtain plate aperture 14b. As shown, a vacuum chamber 16, which houses the mass analyzer 70, is separated from the curtain chamber 14 by a plate 16a having a vacuum chamber sampling orifice 16b. The curtain chamber 14 and vacuum chamber 16 can be maintained at a selected pressure(s) (e.g., the same or different sub-atmospheric pressures, a pressure lower than the ionization chamber) by evacuation through one or more vacuum pump ports 18.

It will also be appreciated by a person skilled in the art and in light of the teachings herein that the mass analyzer 70 can have a variety of configurations. Generally, the mass analyzer 70 is configured to process (e.g., filter, sort, dissociate, detect, etc.) sample ions generated by the ion source 60. By way of non-limiting example, the mass analyzer 70 can be a triple quadrupole mass spectrometer, or any other mass analyzer known in the art and modified in accordance with the teachings herein. Other non-limiting, exemplary mass spectrometer systems that can be modified in accordance various aspects of the systems, devices, and methods disclosed herein can be found, for example, in an article entitled "Product ion scanning using a Q-q-$Q_{linear}$ ion trap (Q TRAP®) mass spectrometer," authored by James W. Hager and J. C. Yves Le Blanc and published in Rapid Communications in Mass Spectrometry (2003; 17: 1056-1064), and U.S. Pat. No. 7,923,681, entitled "Collision Cell for Mass Spectrometer," which are hereby incorporated by reference in their entireties. Other configurations, including but not limited to those described herein and others known to those skilled in the art, can also be utilized in conjunction with the systems, devices, and methods disclosed herein. For instance other suitable mass spectrometers may include single quadrupole, triple quadrupole, ToF, trap, and hybrid analyzers. It will further be appreciated that any number of additional elements can be included in the system 10 including, for example, an ion mobility spectrometer (e.g., a differential mobility spectrometer) that is disposed between the ionization chamber 12 and the mass analyzer 70 and is configured to separate ions based on their mobility through a drift gas in high- and low-fields rather than their mass-to-charge ratio). Additionally, it will be appreciated that the mass analyzer 70 may comprise a detector that can detect the ions which pass through the analyzer 70 and, for example, may supply a signal indicative of the number of ions per second that are detected.

The sampling probe 30 can have a variety of configurations but generally includes an open end by which the liquid delivered from the reservoir 50 is open to the atmosphere, thus exhibiting a liquid-air interface. The open end can further be configured to receive therethrough a sample containing or suspected of containing one or more analytes. By way of non-limiting example, in some embodiments the sample may comprise a liquid sample that can be introduced (e.g., injected, pipetted, acoustically injected) directly into the liquid present within the sample space. It will likewise be appreciated by those skilled in the art in light of the teachings herein that any liquid (e.g., solvent) suitable for directly receiving a liquid sample, for example, and amenable to the ionization process can be provided by the reservoir 50 in accordance with various aspects of the present teachings. In other embodiments, the sample may comprise a solid sample that may be introduced directly into the liquid present within the sample space for dissolution.

Alternatively, as shown in FIG. 1, the sample can be introduced via a sample substrate 20 that can be inserted into the liquid within the sample space of the sampling probe 30. In various aspects, the sample substrate 20 can comprise a substrate having functionalized surfaces (e.g., a solid-phase microextraction (SPME) substrate, surface-coated magnetic particles) to which the analytes of interest have been adsorbed. In such aspects, the liquid provided by reservoir 50 can comprise a desorption solvent such that at least a portion of the absorbed analytes are desorbed from the coated surface into the desorption solvent upon insertion of the coated portion of the substrate 20. It will be appreciated by those skilled in the art that in such aspects any desorption solvent effective to desorb analytes from a substrate 20 (e.g., a SPME device) and amenable to the ionization process is suitable for use in the present teachings. U.S. Pat. No. 5,691,205, entitled "Method and Devise for Solid Phase Microextraction and Desorption," and PCT Pub. No. WO2015188282 entitled "A Probe for Extraction of Molecules of Interest from a Sample," the teachings of which are hereby incorporated by reference in their entireties, describe exemplary sampling substrates suitable for use in accordance with various aspects of the present teachings.

With reference now to FIG. 2, an exemplary sampling probe 30 for receiving a liquid sample or sample substrate 20 through the open end of the probe and suitable for use in the system of FIG. 1 is schematically depicted. As shown, the exemplary sampling probe 30 is generally disposed between the reservoir 50 and ion source 60 and provides a fluid pathway therebetween such that analytes entrained within the liquid provided by the reservoir 50 (e.g., desorption solvent) can be delivered to and ionized by the ion source 60. The sampling probe 30 can have a variety of configurations for receiving a liquid sample through its open end or sampling desorbed analytes from a substrate, but in the depicted exemplary configuration includes an outer tube (e.g., outer capillary tube 32) extending from a proximal end 32a to a distal end 32b and an inner tube (e.g., inner capillary tube 34) disposed co-axially within the outer capillary tube 32. As shown, the inner capillary tube 34 also extends from a proximal end 34a to a distal end 34b. The inner capillary tube 34 comprises an axial bore providing a fluid channel therethrough, which as shown in the exemplary embodiment of FIG. 2 defines a sampling conduit 36 through which liquid can be transmitted from the substrate sampling probe 30 to the ion source 60 via the probe outlet conduit 44c (i.e., the sampling conduit 36 can be fluidly coupled to the inner bore of the electrospray electrode 64 via the fluid handling system 40). On the other hand, the annular space between the inner surface of the outer capillary tube 32 and the outer surface of the inner capillary tube 34 can define a solvent conduit 38 extending from an inlet end coupled to the solvent source 50 (e.g., via the probe inlet conduit 44b) to an outlet end (adjacent the distal end 34b of the inner capillary tube 34). In some exemplary aspects of the present teachings, the distal end 34b of the inner capillary tube 34 can be recessed relative to the distal end 32b of the outer capillary tube 32 (e.g., by a distance h as shown in FIG. 2) so as to define a distal fluid chamber 35 of the substrate sampling probe 30 that extends between and is defined by the distal end 34b of the inner capillary 34 and the distal end 32b of the outer capillary tube 32. Thus, the distal fluid chamber 35 represents the space adapted to contain fluid between the open distal end of the substrate sampling probe 30 and the distal end 34b of the inner capillary tube 34. Further, as indicated by the arrows of FIG. 2 within the sampling probe 30, the solvent conduit 38 is in fluid communication with the sampling conduit 36 via this distal fluid chamber 35. In this manner, fluid that is delivered to the distal fluid chamber 35 through the solvent conduit 38 can enter the inlet end of the sampling conduit 36 for subsequent transmission to the ion source 60. It should be appreciated that though the inner capillary tube 34 is described above and shown in FIG. 2 as defining the sampling conduit 36 and the annular space between the inner capillary tube 34 and the outer capillary tube 32 defines the solvent conduit 38, the conduit defined by the inner capillary tube 34 can instead be coupled to the solvent source 50 (so as to define the solvent conduit) and the annular space between the inner and outer capillaries 34, 32 can be coupled to the ion source 60 (so as to define the sampling conduit).

It will be appreciated that sampling probes in accordance with the present teachings can also have a variety of configuration and sizes, with the sampling probe 30 of FIG. 2 representing an exemplary depiction. By way of non-limiting example, the dimensions of an inner diameter of the inner capillary tube 34 can be in a range from about 1 micron to about 1 mm (e.g., 200 microns), with exemplary dimensions of the outer diameter of the inner capillary tube 34 being in a range from about 100 microns to about 3 or 4 millimeters (e.g., 360 microns). Also by way of example, the dimensions of the inner diameter of the outer capillary tube 32 can be in a range from about 100 microns to about 3 or 4 millimeters (e.g., 450 microns), with the typical dimensions of the outer diameter of the outer capillary tube 32 being in a range from about 150 microns to about 3 or 4 millimeters (e.g., 950 microns). The cross-sectional shapes of the inner capillary tube 34 and/or the outer capillary tube 32 can be circular, elliptical, super-elliptical (i.e., shaped like a super-ellipse), or even polygonal (e.g., square). Further, though the exemplary sampling probe 30 is depicted in FIG. 2 as being open at its upper end, it will be appreciated that sampling probes suitable for use in the system of FIG. 1 and modified in accordance with the present teachings can be oriented in a variety of orientations (e.g., upside down) as described, for example, in U.S. Pub. No. 20130294971 entitled "Surface Sampling Concentration and Reaction Probe" and U.S. Pub. No. 20140216177 entitled "Method and System for Formation and Withdrawal of a Sample From a Surface to be Analyzed," the teaching of which are hereby incorporated by reference in their entireties. Other non-limiting, exemplary sampling probes that can be modified in accordance various aspects of the systems, devices, and methods disclosed herein can be found, for example, in an article entitled "An open port sampling interface for liquid introduction atmospheric pressure ionization mass spectrometry," authored by Van Berkel et al. and published in Rapid Communication in Mass Spectrometry 29(19), 1749-1756, which is incorporated by reference in its entirety.

As shown in FIG. 2, an exemplary SPME substrate 20 having a coated surface 22 to which analytes can be adsorbed, as described, for example, PCT Pub. No. WO2015188282 entitled "A Probe for Extraction of Molecules of Interest from a Sample," the teachings of which are hereby incorporated by reference in its entirety, is schematically depicted as being inserted through the open end of the substrate sampling probe 30 such that the coated surface 22 is at least partially disposed in the desorption solvent (e.g., the desorption solvent within the distal fluid chamber 35). As shown in FIG. 2, by way of non-limiting example, the exemplary substrate 20 can comprise an extended surface 22 upon which a SPME extraction phase (e.g., layer) has been coated and to which one or more analytes of interest can be adsorbed during extraction from a sample. Upon the coated surface 22 being inserted into the distal fluid chamber 35, the desorption solvent within the distal fluid chamber 35 can be effective to desorb at least a portion of the one or more analytes adsorbed on the coated surface 22 such that the desorbed analytes can flow with the desorption solvent into the inlet of the sampling conduit 36. Substrates for use in systems and methods in accordance with the present teachings are generally able to be at least partially inserted into a fluid pathway provided by a substrate sampling probe 30 such that the desorption solvent provided thereby is effective to desorb one or more analytes of interest from the substrate, though the substrate configuration (e.g., particles, fibers, blades, micro-tips, pins, or mesh) and/or coating (e.g., HLB-PAN, C18-PAN, antibodies, etc.) is not particularly limited. Indeed, any known substrate and coating chemistries known in the art or hereafter developed and modified in accordance with the present teachings can be used in the methods and systems disclosed herein. Other exemplary SPME devices suitable for use in accordance with various aspects of the present teachings are described, for example, in U.S. Pat. No. 5,691,205, entitled "Method and Devise for Solid Phase Microextraction and Desorption," the teachings of which are hereby incorporated by reference in their entireties.

As shown in FIG. 2, the reservoir 50 (e.g., source of desorption solvent or other liquid) can be fluidly coupled to the solvent conduit 38 via a supply conduit 44b through which liquid can be delivered at a selected volumetric rate (e.g., under the influence of pump 43 of FIG. 1). Any desorption solvent effective to desorb analytes from a substrate 20 (e.g., a SPME device) and amenable to the ionization process is suitable for use in the present teachings. Additionally or alternatively, it will be appreciated that one or more pumping mechanisms can likewise be provided for controlling the volumetric flow rate through the sampling conduit 36 and/or the electrospray electrode 64 of the ion source 60, the volumetric flow rates selected to be the same or different from that provided by the pump 43. By way of example and as noted above, changes to the flow rate of the nebulizer gas can be effective to adjust the volumetric flow rate through the sampling conduit 36.

As noted above, the sampling probe 30 of FIG. 2 additionally includes an ultrasonic transmitter 95 coupled to an outer surface of the outer conduit for generating ultrasound energy that can propagate at least through the sampling probe 30 and liquid within the sample space 35. Though the transmitter 95 is depicted as being coupled adjacent the distal end 32b of the outer capillary 32, it will be appreciated that the transmitter can be directly or indirectly coupled to any portion of the sampling probe 30 (e.g., via clamping, adhesion, magnetic attraction) or integrated within the sampling probe at a variety of locations effective to generate vibrations within the sample substrate 20, the sampling probe 30, and/or the liquid within the sampling probe 35 in accordance with various aspects of the present teachings as otherwise discussed herein. In some aspects, for example, the transmitter 95 can be disposed in the fluid flow path through the sampling probe 35. By way of non-limiting example, an ultrasonic transmitter 95 coupled to the sampling probe as shown for example in FIG. 2 can be configured to generate ultrasonic waves on a substantially constant basis (e.g., under the control of controller 80) so that ultrasonic waves are continually propagated within the sampling probe 30 and the liquid accessible by its open end. However, in other aspects, the controller 80, operatively coupled to the ultrasonic transmitter 95, can generate control signals such that the ultrasound energy is generated at selected intervals automatically (e.g., according to a protocol) or manually by the user, for example, only upon insertion of a sample substrate 20 within the desorption solvent of the sample space 35. In various aspects, the controller 80 can be integrated within the ultrasonic transmitter 95 or may be a separate device connected to the ultrasonic transmitter 95. For example, though in some implementations the ultrasound energy may not be effective to increase elution efficiency from a sold-phase substrate upon which analytes are adsorbed as otherwise discussed herein (e.g., during the introduction of a liquid sample to the solvent within the sample space 35), it will nonetheless be appreciated in accordance with various aspects of the present teachings that the provision of ultrasound energy to the liquid within the sampling probe can also be effective to remove bubbles prior to the liquid transmitted to the ion source 60 via the sampling conduit 36. In such aspects, for example, that the degassing of liquid being transmitted to the ion source 60 can be performed substantially continuously so as to prevent any bubbles present in the solvent flow, whether during sampling or between samplings, from being discharged by the ion source 60.

With reference now to FIG. 3, another exemplary sample substrate 20 and sampling probe 30 configured to receive the sample substrate 20 (or a liquid sample) through the probe's open end is schematically depicted. As shown, the exemplary sampling probe 30 is substantially identical to that depicted in FIG. 2, but differs in that the depicted sampling probe 30 does not include an ultrasound transmitter coupled thereto. To the contrary, in the exemplary implementation of the system of FIG. 1 as shown in FIG. 3, the ultrasonic transmitter 95 is coupled to the sample substrate 20 itself so as to generate vibrations in at least the coated surface portion 22 of the substrate 20 to which the analytes are adsorbed. As otherwise discussed herein, activation of the ultrasonic transmitter 95 upon insertion of the substrate 20 within the sampling space 35 can be effective to increase the desorption efficiency of analytes therefrom. It will be appreciated in light of the present teachings that the transmitter 95 need not be coupled directly to the sample substrate, but instead may be coupled to a substrate holder for gripping the sample substrate 20, for example. In various exemplary aspects, the exemplary system 10 can include an actuation mechanism (not shown) such as a robotic arm, stage electromechanical translator, and/or step motor that can be coupled to a sample holder so as to grip, hold, or otherwise couple to a sampling substrate 20 for automated introduction into the sample space 35. In such aspects, the ultrasonic transmitter can be coupled to the actuation mechanism or sample arm in a position so as to cause the propagation of ultrasonic energy to the sample substrate 20. One exemplary robotic system suitable for use in accordance with the present teachings is the Concept-96 autosampler marketed by PAS Technologies). In accordance with an exemplary automated workflow, the actuation mechanism can under the control of the controller 80 introduce the substrate 20 into the sample space 35 of the sampling probe 30, with the controller activating the ultrasonic transmitter 95 associated therewith at a time corresponding to the insertion of the substrate 20. It will further be appreciated that the same or different actuation mechanism can likewise be utilized in a complete sample preparation workflow including, for example, conditioning the substrate (e.g., coating or otherwise functionalizing the surface to enable extraction of an analyte of interest), extraction/enrichment of the analytes from the sample (e.g., by immersing the coated surface in the sample, with or without vortexing), rinsing the extracted sample (e.g., by immersing the substrate 20 having analytes adsorbed thereto in $H_2O$ so as to remove some interfering molecules, salts, proteins, etc.), and inserting the rinsed substrate 20 within the sample space of the sampling probe 30.

Figures 4A, 4B, 4C:
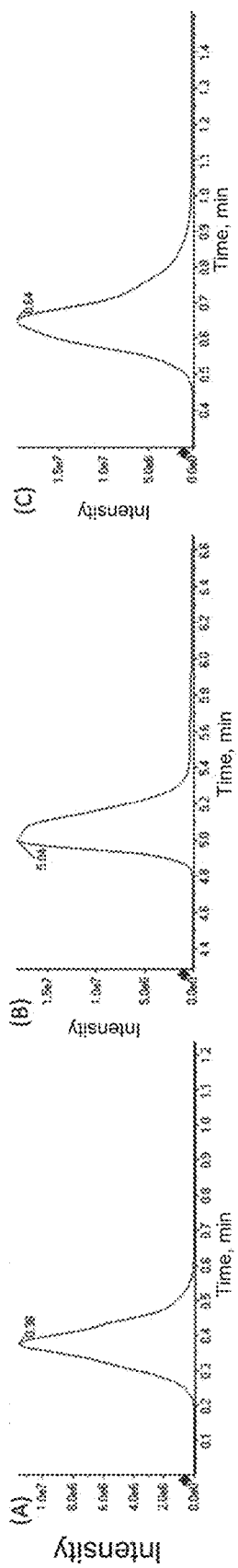
FIGS. 4A-C respectively depict exemplary MS data generated under conditions in which a) no ultrasonic transmitter is utilized, b) a sampling probe having an ultrasonic transmitter coupled thereto as shown in FIG. 2 is utilized, and c) a SPME substrate having an ultrasonic transmitter coupled thereto as shown in FIG. 3 is utilized.

With reference now to FIGS. 4A-C and FIG. 5, exemplary MS data are provided depicting the improvement in the detected signals when applying ultrasound energy to the system 10 in accordance with various aspects of the present teachings. The experimental conditions utilized to generate FIGS. 4A-C were identical except for the inclusion of an ultrasonic transmitter as follows: no ultrasound energy was applied during sampling (FIG. 4A), an ultrasound transducer coupled to the sampling probe 30 was utilized to generated ultrasound energy (FIG. 4C); an ultrasound transducer coupled to the sampling substrate 20 was utilized to generated ultrasound energy (as in FIG. 4C). In particular, the ultrasound energy applied to generate FIGS. 4B and 4C had a frequency of about 25 kHz. The samples comprised SPME fibers (marketed by Supelco) that were extracted in a sample of with clenbuterol. As shown in FIGS. 4A-4C, experimental conditions in which ultrasound energy was applied during sampling (i.e., FIGS. 4B and 4C) resulted in approximately a 50% in signal intensity relative to the conditions in which no ultrasound energy was applied (i.e., FIG. 4A).

Figure 5:
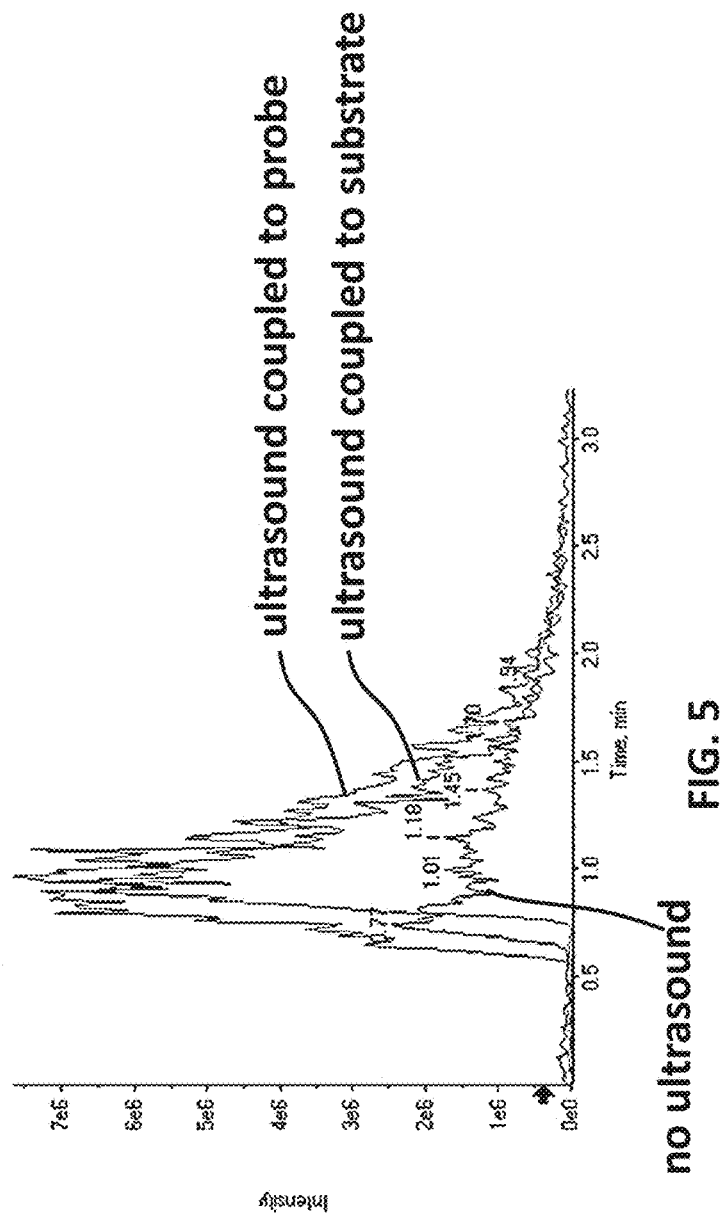
FIG. 5 depicts additional exemplary MS data generated under the conditions of FIGS. 4A-4C.

With specific reference now to FIG. 5, similar results were obtained utilizing SPME blades (a metal substrate having both sides comprising a coated membrane as described in and PCT Pub. No. WO2015188282). As shown in FIG. 5, even greater signal enhancement (maximum signal intensity) was observed under the ultrasound-applied conditions relative to the conditions without ultrasound applied as compared to the relative increase depicted in FIGS. 4A-C. Without being bound by any particular theory, this substantial increase may be due to improved propagation of the ultrasound energy through the metal SPME blade relative to the SPME fiber.

In addition to utilizing ultrasound energy to improve desorption and/or degas the liquid being delivered to the ion source (e.g., removing bubbles) as otherwise discussed herein, in some additional or alternative aspects of the present teachings, the ultrasound transmitter 95 can be utilized as part of a feedback control system for controlling the surface profile of the liquid-air interface within the sampling probe's port. In some aspects, for example, the system of FIG. 1 can include both an ultrasonic transmitter for generating ultrasound energy and an ultrasound detector (e.g., which can be separate or integrated with an ultrasonic transducer) that can be disposed relative to the transmitter so as to detect the ultrasound energy that is reflected from the liquid-air interface. Ultrasound detectors 90 suitable for use in accordance with the present teachings can have a variety of configurations but are generally configured to convert ultrasound waves into an electrical signal, for example, that is indicative of the liquid level in the sampling probe 30 (e.g., based on return time of the reflected ultrasound waves). As discussed below, in such aspects, the controller 80 can be configured to generate control signals configured to automatically adjust (e.g., without human intervention) the flow rate of the liquid into and/or out of a sampling probe to be selectively adjusted so as to maintain a desired liquid-air interface within the sampling port and a stable and reproducible analyte flow of consistent dilution to the ion source, thereby increasing the reproducibility and/or accuracy of the MS analysis. Additionally or alternatively, the feedback control can utilize the detected ultrasound energy so as to provide for the automated adjustment of the surface profile of the liquid-air interface in accordance with a change in the desired set point according to an experimental workflow (e.g., automated adjustment between an interface corresponding to a vortex sampling set point and an overflow cleaning set point between samplings).

Figure 6:
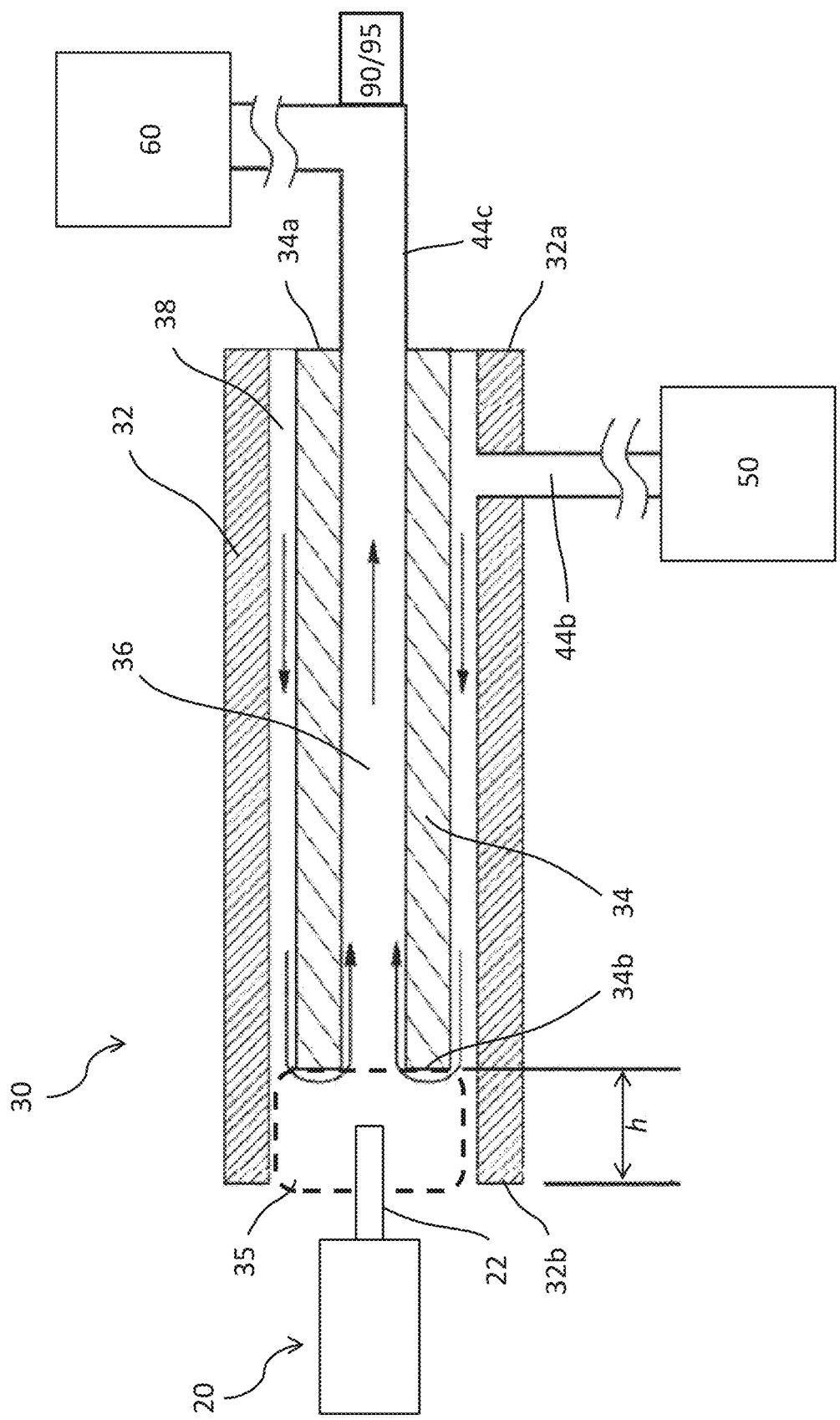
FIG. 6, in a schematic diagram, illustrates an exemplary sampling interface in accordance with various aspects of the applicant's teachings in which the ultrasound energy is utilized in a feedback-control system for detecting the surface profile of liquid within a sampling probe in accordance with various aspects of the applicant's teachings.

With reference to FIGS. 1 and 6, the system 10 includes an ultrasound detector 90 for generating data indicative of the surface profile (e.g., shape) of the liquid-air interface and a controller 80 operatively coupled thereto so as to receive the data and adjust the flow rates of liquid within the sampling probe 30. In accordance with various aspects of the present teachings, the control signals generated by the controller 80 can automatically maintain and/or adjust the surface profile to be a desired profile (e.g., without human intervention) by controlling the speed of the pump 43 and/or the flow rate of nebulizer gas provided by the nebulizer gas source 63 to the outlet end of the electrospray electrode 64, by way of non-limiting example. It will be appreciated that such a controller 80 can be implemented in a variety of manners in accordance with the present teachings, but generally comprises one or more processors configured to analyze the data indicative of the surface profile of the liquid-air interface and/or generate control signals for controlling the operations of various elements of the system 10 as otherwise discussed herein. By way of non-limiting example, the controller 80 can be in the form of a digital controller configured to process (e.g., via an algorithm) the data provided by the ultrasound detector 90 and provide real-time adjustments to the surface profile.

With reference specifically to FIG. 6, another exemplary sampling probe 30 configured to receive the sample substrate 20 (or a liquid sample) through the probe's open end is schematically depicted in accordance with various aspects of the present teachings. As shown, the exemplary sampling probe 30 is substantially identical to that depicted in FIG. 2, but differs in that the ultrasonic transmitter 95 is coupled to the sampling probe so as to direct its ultrasound energy at the liquid-air interface. In particular, the ultrasonic transmitter 95 is disposed below the sampling conduit 36 so as to direct the ultrasound energy substantially at the center of the liquid-air interface and which can be reflected thereat for detection by the ultrasound detector 90. That is, the transmitter can propagate ultrasound waves from below the conduit wall 44c into the liquid, which upon traveling to the interface, are reflected at the phase boundary. The reflected ultrasound signal can return to and be detected by the ultrasound detector 90, with the return time data being used by the controller 80 to determine the surface profile (e.g., liquid level) of the liquid-air interface. As discussed in detail below with reference to FIG. 7, the liquid-air interface can take on a variety of surface configurations or profiles at the open end, and the ultrasound energy will exhibit a reduced return time if reflected from the center of the liquid-air interface depicted in FIG. 7A (super-critical vortex surface profile) relative to that depicted in FIG. 7E (convex surface profile). In this manner, the controller 80 can additionally or alternatively control the flow rate of the desorption solvent within the sampling probe 30 in accordance with various aspects of the present teachings by adjusting one or more of a pump and/or valve 65 for controlling the pressure or flow rate of the nebulizer gas. By way of non-limiting example, the controller 80 can be configured to maintain the flow rate of liquid provided by the pump 43 as substantially constant, while accounting for changes in experimental conditions (e.g., temperature effects, instability of the pump 43, changes of solvent/sample composition, for example, resulting in changes in sample/solvent viscosity, introduction rate/volume of liquid samples into the sample space 35) by adjusting the flow of nebulizer gas provided from the nebulizer source 63 to thereby adjust the flow of liquid within the sampling probe 30 in accordance with the present teachings. Alternatively or additionally, it will be appreciated that the flow rate of the pump 43 can be adjusted under the influence of the controller so as to adjust and/or maintain the surface profile of the liquid-air interface. For example, in implementations in which a nebulizer gas is not provided or the nebulizer gas pressure must remain fixed due to conditions of the ion source 60 or within the ionization chamber 12, the controller 80 can modify the surface profile of the liquid-air interface by increasing or decreasing the speed of the pump 43.

Depending on the liquid flow rates within the solvent conduit 38 and the sampling conduit 36, the liquid within the sample space 35 may take on a variety of surface configurations or profiles at the open end. Feedback control systems in accordance with various aspects of the present teachings are configured to detect and/or monitor the surface profile (e.g., shape) of the liquid-air interface at the sample space 35 and to adjust the volumetric flow rates through the various channels of the sampling probe 30 and/or the electrospray electrode 44 so as to control the surface profile. Depending on the relationship of the volumetric flow rate into the sampling probe 30 (e.g., via solvent conduit 38, which can be primarily due to action of the pump 43) and the volumetric flow rate of the liquid from the sample space 35 to the ion source 60 (e.g., via the sampling conduit 36, which can be primarily due to the effect of the nebulizer gas), various liquid conditions can be formed in the sampling port. With reference now to FIG. 7A-F, various exemplary surface profiles of the liquid-air interface are depicted, with each representing a potential surface profile that can be detected by detector 90 in accordance with the present teachings: super-critical vortex (FIG. 7A); critical vortex (FIG. 7B); subcritical vortex (FIG. 7C); balanced (FIG. 7D); convex (FIG. 7E); and convex spill over (FIG. 7F). As shown schematically in FIG. 7A, when the liquid-air interface exhibits the super-critical vortex profile, the minimum height of the liquid-air interface is below the level of the distal end 34b of the inner capillary 34, while the maximum height of the interface is at the level of the distal end 32b of the outer capillary 32. As shown in FIG. 7B, in liquid-air interfaces exhibiting a critical vortex shape, the minimum height of the liquid-air interface is at about the level of the of the distal end 34b of the inner capillary 34, while the maximum height of the interface is at the level of the distal end 32b of the outer capillary 32. In the subcritical profile of FIG. 7C, the minimum height of the liquid-air interface is between the level of the distal end 34b of the inner capillary 34 and the distal end 32b of the outer capillary 32, with the maximum height of the interface being at the level of the distal end 32b of the outer capillary 32. In the balanced profile of FIG. 7D, the liquid-air interface is substantially planar at the level of the distal end 32b of the outer capillary 32, while in the convex profile (FIG. 7E) the maximum height of the liquid-air interface is above the level of the distal end 32b of the outer capillary 32 so as to form a dome-like shape from the minimum height of the liquid-air interface at the level of the distal end 32b of the outer capillary. Finally, FIG. 7F depicts the convex spill over surface profile in which the maximum height of the liquid-air interface is above the level of the distal end 32b of the outer capillary 32 and the liquid overflows from the distal end 32b thereof.

While the specific surface profile generated at the liquid-air interface can be a function of size of the various conduits, liquid temperature, surface tension, and other experimental conditions as noted otherwise herein, the level of the liquid along the central longitudinal axis within the sample space (e.g., relative to the distal end 34b of the inner capillary 34) can generally be increased by increasing the volumetric flow rate of liquid into the sampling probe (e.g., via solvent conduit 38), by decreasing the volumetric flow rate of liquid out of the sampling probe (e.g., via sampling conduit 36), or some combination of the two. By way of example, the balanced condition (e.g., a substantially planar liquid-air interface) can be achieved when the volumetric flow rates are approximately equal. However, when the solvent delivery rate provided by the pump 43 is relatively low compared with the solvent removal rate due to the aspiration force generated by the nebulizer gas, for example, a vortex surface profile can be formed as in FIGS. 7A-7C.

Figure 8A:
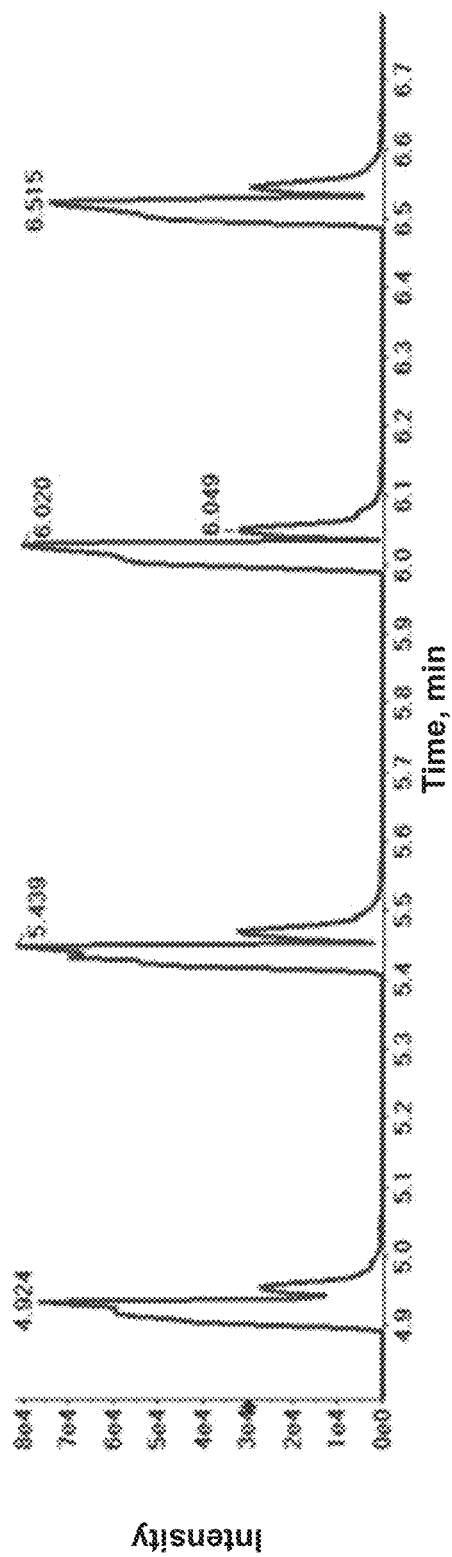
FIGS. 8A-B depict exemplary MS data generated by the serial insertion of a plurality of samples within a sampling interface exhibiting a vortex surface profile (under low-flow conditions) and a dome-like surface profile (under high-flow condition).
Figure 8B:
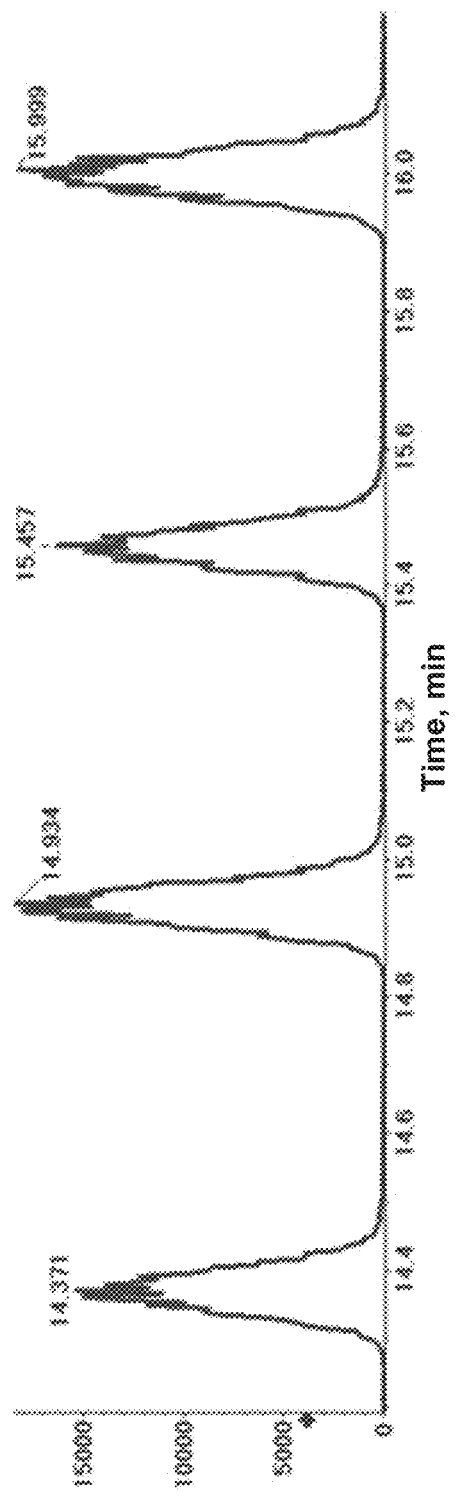

With reference now to FIGS. 8A-B, exemplary MS data are provided depicting the variability in the detected signals under various flow conditions and liquid-air interface surface profile of a sampling probe in accordance with various aspects of the present teachings. The experimental conditions utilized to generate FIGS. 8A-B were identical except for the solvent flow rate provided by the solvent pump (e.g., pump 43 of FIG. 1). In particular, the samples comprised injections of 2 µL reserpine (in 50/50 MeOH:H$_2$O) into methanol being provided by the pump at 70 µL/min (FIG. 8A, low-flow conditions) and 150 µL/min (FIG. 8B, overflow conditions), and the nebulizer gas was maintained at 90 psi. Under the low-flow conditions, there may be less dilution effect due to a decreased volume of liquid within which the analytes are introduced, thereby resulting in the presence of higher, narrower peaks in the MS signal, as shown in the exemplary data of FIG. 8A. It will be noted that because some gas can be aspirated together with the liquid (e.g., as in the supercritical vortex condition of FIG. 7A), aberrations or spikes in the MS data may also be observed when the bubbles are discharged into the ionization chamber. On the other hand, when the solvent delivery rate is relatively high as in experimental conditions utilized to generate FIG. 8B, a dome-like, convex surface profile shape can be formed (as in FIG. 7F). Though a more significant dilution effect may be observed in high-flow/overflow conditions through the presence of the wider and less-intense MS peaks of FIG. 8B relative to those of FIG. 8A, the convex profile may nonetheless be desired under certain experimental conditions, for example, to enable an increased area of a SPME substrate having analytes adsorbed thereto to be disposed within desorption solvent of the sample space. In any event, in comparing the MS signal of a plurality of substrates being inserted into the low and high flow rates of FIGS. 8A and 8B, respectively, it will be appreciated by the person skilled in the art that the methods and systems described herein for providing feedback control so as to maintain a stable, consistent surface profile (e.g., at the time of sample introduction for serial samplings) may be critical in ensuring the sensitivity, accuracy, and reproducibility of the resultant MS data.

Figure 9:
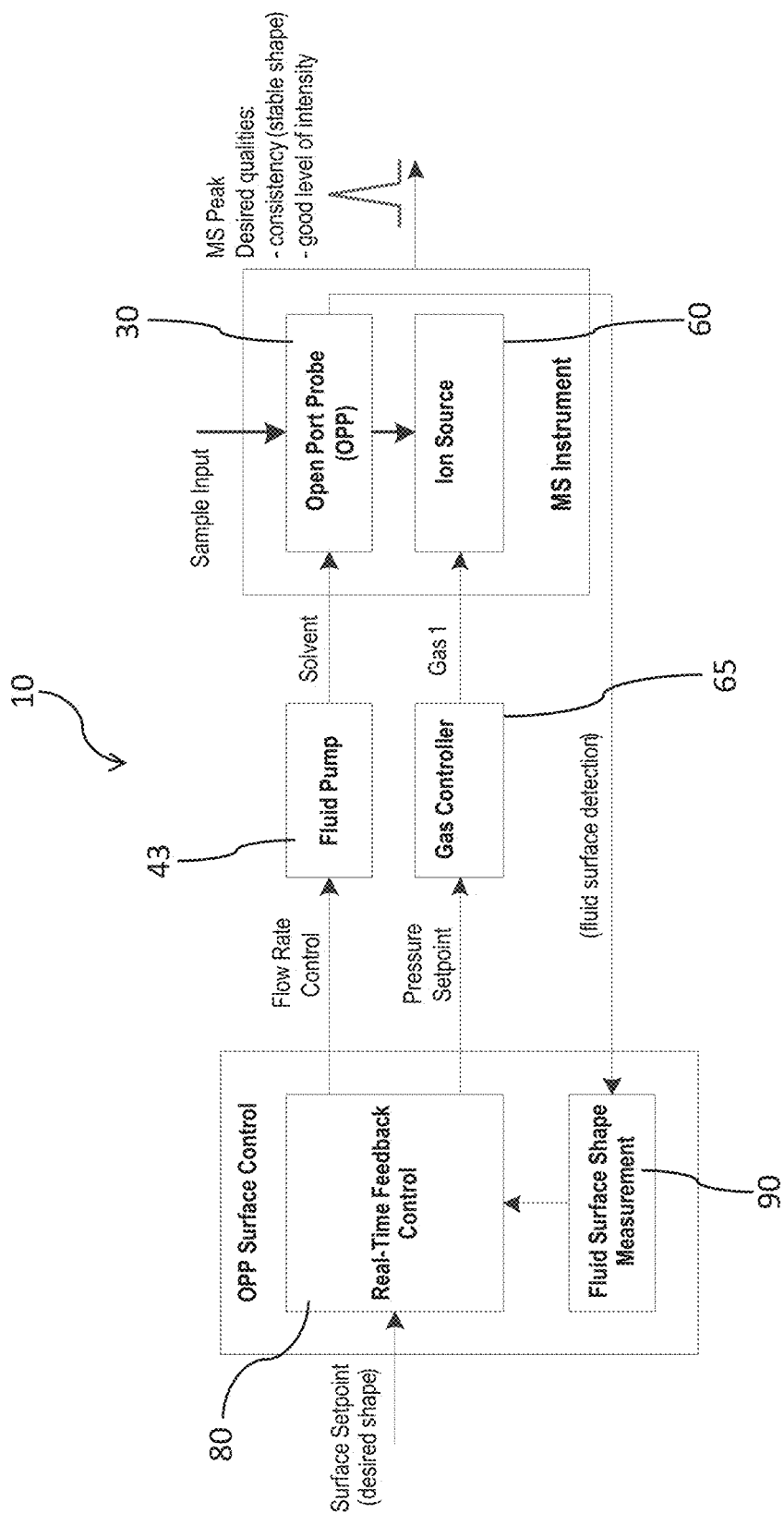
FIG. 9 depicts an exemplary schematic block diagram of an implementation of a feedback control system in accordance with various aspects of the present teachings.

With reference now to FIG. 9, a schematic block diagram of an implementation of a feedback control system in accordance with various aspects of the present teachings is depicted. Though settings for the flow rates of the liquid provided by the pump 43 and/or the flow rate and/or pressure of nebulizer gas may initially be set at a value corresponding to an expected surface profile condition (e.g., by controlling the speed of the pump 43 and/or by adjusting the opening of the valve 65), variations in experimental conditions (e.g., temperature, surface tension of the liquid, instability in pump speed) may lead to undesired changes to the surface profile of the liquid-air interface. Thus, with the pump 43 providing liquid from the reservoir to the sample space 35 of the sampling probe 30 and the nebulizer source 63 and valve 65 controlling the aspiration force of the liquid from the sampling conduit 32, the ultrasound detector 90 (e.g., of FIG. 6) can generate data indicative of a surface profile of the liquid-air interface within the open end of the sampling probe 30 (e.g., shape, liquid level at the center of the liquid-air interface). Based on the data received from the detector 90, the controller 80 can then utilize a surface profile algorithm to determine the present surface profile of the liquid-air interface, and if necessary, generate control signals to adjust the pump speed or nebulizer gas pressure to modify the flow rate of liquid within the sampling probe 30 to produce a surface profile in accordance with the surface set point (which can be selected by the user or determined automatically).

Use of the feedback control system of FIGS. 1 and 6 in accordance with various aspects of the present teachings will now be described with respect to an exemplary automated workflow for analyzing a plurality of samples. The system 10 may be initiated by turning on the pump 43, ion source 60, and gas flow provided by the nebulizer source 63. After allowing the system 10 to stabilize, the detector 90 can detect the surface profile of the liquid-air interface of the sampling probe. In accordance with various aspects, the controller 80 can then compare the surface profile data with a first reference surface profile (e.g., a sampling set point, which can be pre-programmed or selected by the user) to determine if adjustments to the surface profile are necessary to be in accordance with the sampling set point prior to introducing a first sample to the sample space 35. For example, if the surface profile does not correspond to the sampling set point, the controller 80 can increase or decrease the speed of the pump 43 and/or the flow rate of nebulizer gas accordingly as otherwise discussed herein. By way of non-limiting example, the controller 80 can be configured to maintain the flow rate of liquid provided by the pump 43 substantially constant, while accounting for changes in experimental conditions (e.g., temperature effects, instability of the pump 43) by adjusting the flow of nebulizer gas provided from the nebulizer source 63 such that the surface profile of the liquid-air interface is made to correspond to the sampling set point. Upon confirming and/or adjusting the surface profile to be in accordance with the sampling set point, a first sample can then be introduced within the liquid contained within the sample space 35.

In various aspects, the exemplary system 10 of FIG. 9 can include an actuation mechanism (not shown) such as a robotic arm, stage electromechanical translator, and/or step motor that can be coupled to a sample holder so as to grip, hold, or otherwise couple to a sampling substrate 20 for automated introduction into the sample space 35. Alternatively, the actuation mechanism can be configured to introduce (e.g., pipette, acoustically inject) a liquid sample within the sample space 35, including, for example, aspirating the liquid sample from a sample source (e.g., a 96 well plate), transporting the liquid sample to the open end of the sampling probe 30, transporting a carrier plate containing one or more samples to align with the open end, and dispensing the liquid sample into the solvent via the liquid-air interface (e.g., including pipette injection as well as other non-contact techniques including dispensers, such as by acoustic dispensers or pneumatic dispensers, from an aligned sample well). One exemplary robotic system suitable for use in accordance with the present teachings is the Concept-96 autosampler marketed by PAS Technologies). In accordance with an automated workflow, the actuation mechanism can under the control of the controller 80 introduce the substrate 20 (or a liquid sample, for example) into the sample space 35 of the sampling probe 30 after the controller 80 determines that the surface profile corresponds to the desired sampling surface profile based on the ultrasound energy generated by the ultrasonic transmitter 95 that is reflected from the liquid-air interface and detected by the ultrasound detector 90. It will further be appreciated that the same or different actuation mechanism can likewise be utilized in a complete sample preparation workflow including, for example, conditioning the substrate (e.g., coating or otherwise functionalizing the surface to enable extraction of an analyte of interest), extraction/enrichment of the analytes from the sample (e.g., by immersing the coated surface in the sample, with or without vortexing), rinsing the extracted sample (e.g., by immersing the substrate 20 having analytes adsorbed thereto in $H_2O$ so as to remove some interfering molecules, salts, proteins, etc.), and inserting the rinsed substrate 20 within the sample space of the sampling probe 30.

As discussed otherwise herein, analytes introduced into the sample space (e.g., desorbed from a sample substrate 20 by the desorption solvent provided from the reservoir 50) and entrained within the liquid (e.g., desorption solvent) can then be delivered to the ion source 60 and mass analyzer 70 for ionization and mass spectrometric analysis. After the analytes from the first sample have been transmitted from the sample space 35 (e.g., after removal of a sampling substrate 20), in some aspects, the controller 80 can be configured to effect an increase the volumetric flow rate of liquid from the reservoir 50 to the sample space 35 so as to temporarily overflow liquid through the open end of the sampling probe 30 before another substrate 20 is inserted therein, thereby cleaning residual sample deposited by the withdrawn substrate and/or preventing any airborne material from being transmitted into the sampling conduit 36 in between serial samplings. By way of example, after the first substrate 20 has been removed, the controller 80 can compare the data generated by the ultrasound detector 90 to a second reference surface profile (e.g., a cleaning set point having a surface profile as in FIG. 7E) and automatically adjust the flow rates provided by one of the pump 43 and nebulizer source 63 to correspond to the surface profile of the cleaning set point for a given duration. Prior to introduction of a second sample, the controller 80 can then utilize the data generated by the surface profile detector 90 to re-adjust the surface profile to match the sampling profile utilized during sampling from the first substrate. In this manner, the feedback control system can account for variations in experimental condition between samplings, while helping to ensure consistent dilution effects, thereby increasing the accuracy and reproducibility of the MS data between multiple samplings. In addition, in accordance various aspects of the present teachings, the same ultrasound energy that is generated by the ultrasonic transmitter 95 for detection as part of the feedback control system can likewise provide for increased desorption efficiency (e.g., from a solid-phase sample substrate) and/or improved degassing as otherwise discussed herein.

The section headings used herein are for organizational purposes only and are not to be construed as limiting. While the applicant's teachings are described in conjunction with various embodiments, it is not intended that the applicant's teachings be limited to such embodiments. On the contrary, the applicant's teachings encompass various alternatives, modifications, and equivalents, as will be appreciated by those of skill in the art.

What is claimed is:

1. A system for analyzing a chemical composition of a specimen, comprising:
   a reservoir for storing a liquid;
   a sampling probe having an open end partially defining a sample space configured to receive liquid from the reservoir, said liquid within the sample space further configured to receive through the open end one or more analytes of a sample;
   a pump for delivering the liquid from the reservoir to an ion source via the sample space, wherein the ion source is configured to discharge the liquid having said one or more analytes entrained therein into an ionization chamber in fluid communication with a sampling orifice of a mass spectrometer;
   an ultrasonic transmitter for applying ultrasound energy the liquid within the sample space;
   an ultrasound detector configured to detect ultrasound energy reflected from a liquid-air interface in the sample space so as to generate data indicative of a surface profile of the liquid-air interface at the open end of the sampling probe; and
   a controller operatively coupled to the ultrasound detector and configured to generate control signals based on the surface profile data for adjusting the surface profile of the liquid-air interface,
   wherein the control signals generated by the controller are configured to adjust the flow rate of liquid within the sampling probe by adjusting at least one of the flow rate of liquid provided by the pump and the flow rate of a nebulizer gas that surrounds the discharge end of the ion source.

2. The system of claim 1, wherein the sample comprises a liquid sample containing said one or more analytes.

3. The system of claim 1, wherein the liquid comprises a desorption solvent and the sample comprises a sample substrate having one or more analytes adsorbed thereto such that at least a portion of said one or more analytes are desorbed therefrom into the desorption solvent within the sample space.

4. The system of claim 1, wherein the ultrasonic transmitter is coupled to the sampling probe so as to apply ultrasound energy to the sampling probe and the liquid therewithin.

5. The system of claim 1, wherein the ultrasound energy is configured to increase agitation of the liquid within the sample space.

6. A system for analyzing a chemical composition of a specimen, comprising:
   a reservoir for storing a liquid;
   a sampling probe having an open end partially defining a sample space configured to receive liquid from the reservoir, said liquid within the sample space further configured to receive through the open end one or more analytes of a sample;
   a pump for delivering the liquid from the reservoir to an ion source via the sample space, wherein the ion source is configured to discharge the liquid having said one or more analytes entrained therein into an ionization chamber in fluid communication with a sampling orifice of a mass spectrometer;
   an ultrasonic transmitter for applying ultrasound energy to the liquid within the sample space;
   wherein the ultrasonic transmitter is configured to degas the liquid provided by the pump prior to the liquid being delivered to the ion source.

7. The system of claim 1, wherein the sampling probe comprises:
   an outer capillary tube extending from a proximal end to a distal end; and
   an inner capillary tube extending from a proximal end to a distal end and disposed within said outer capillary tube, wherein said distal end of the inner capillary tube is recessed relative to the distal end of the outer capillary tube so as to define the sample space between the distal end of the inner capillary tube, a portion of an inner wall of the outer capillary tube, and the distal end of the outer capillary tube, wherein said inner and outer capillary tubes define a solvent conduit and a sampling conduit in fluid communication with one another via said sample space, said solvent conduit extending from an inlet end configured to receive solvent from the reservoir to an outlet end terminating at said sample space, and said sampling conduit extending from an inlet end commencing at said sample space for receiving from the sample space desorption solvent in which the desorbed analytes are entrained to an outlet end fluidly coupled to the ion source.

8. A method for chemical analysis, comprising:

providing a flow of liquid to a sampling probe, said sampling probe having an open end partially defining a sample space configured to receive the liquid and further configured to receive through the open end one or more analytes of a sample into the liquid within the sample space;

directing a flow of the liquid having the one or more analytes entrained therein from the sample space to an ion source configured to discharge the liquid having the one or more analytes entrained therein into an ionization chamber in fluid communication with a sampling orifice of a mass spectrometer;

applying ultrasound energy to the liquid within the sample space, wherein the ultrasound energy is configured to degas the liquid provided by the pump prior to the liquid being delivered to the ion source; and discharging the liquid having the one or more analytes entrained therein into the ionization chamber for ionization therein.

9. A method for chemical analysis, comprising:

providing a flow of liquid to a sampling probe, said sampling probe having an open end partially defining a sample space configured to receive the liquid and further configured to receive through the open end one or more analytes of a sample into the liquid within the sample space;

directing a flow of the liquid having the one or more analytes entrained therein from the sample space to an ion source configured to discharge the liquid having the one or more analytes entrained therein into an ionization chamber in fluid communication with a sampling orifice of a mass spectrometer;

applying ultrasound energy to the liquid within the sample space;

wherein applying ultrasound energy comprises directing the ultrasound energy through the liquid toward a liquid-air interface at the open end of the sampling probe, the method further comprising:

detecting the reflected ultrasound energy to generate data indicative of a surface profile of the liquid-air interface at the open end of the sampling probe; and based on the surface profile data, adjusting the flow rate of the liquid within the sampling probe so as to adjust the surface profile of the liquid-air interface.

10. A system for analyzing a chemical composition of a specimen, comprising:

a reservoir for storing a liquid;

a sampling probe having an open end partially defining a sample space configured to receive liquid from the reservoir, said liquid within the sample space further configured to receive through the open end one or more analytes of a sample;

a pump for delivering the liquid from the reservoir to an ion source via the sample space, wherein the ion source is configured to discharge the liquid having said one or more analytes entrained therein into an ionization chamber in fluid communication with a sampling orifice of a mass spectrometer;

an ultrasonic transmitter for applying ultrasound energy to at least one of the liquid within the sample space, the sampling probe, and a sample substrate to be inserted into the liquid within the sample space an ultrasound detector for detecting the ultrasound energy reflected from the liquid-air interface at the open end of the sampling probe so as to generate data indicative of a surface profile of the liquid-air interface; and a controller configured to generate control signals based on the surface profile data for adjusting the surface profile of the liquid-air interface.

11. The system of claim 1, wherein the ultrasonic transmitter and the ultrasound detector are integrated within an ultrasonic transducer.

12. The system of claim 1, wherein the ultrasonic transmitter and the ultrasound detector are disposed so as to reflect and detect respectively the level of liquid within the sampling space at the center thereof.

* * * * *